(12) United States Patent
Sorrentino et al.

(10) Patent No.: US 10,897,760 B2
(45) Date of Patent: Jan. 19, 2021

(54) EFFICIENT PERIODIC SCHEDULING FOR WIRELESS COMMUNICATIONS

(71) Applicant: Telefonaktiebolaget LM Ericsson (publ), Stockholm (SE)

(72) Inventors: Stefano Sorrentino, Solna (SE); Marco Belleschi, Solna (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/073,960

(22) PCT Filed: Feb. 3, 2017

(86) PCT No.: PCT/SE2017/050097
§ 371 (c)(1),
(2) Date: Jul. 30, 2018

(87) PCT Pub. No.: WO2017/135881
PCT Pub. Date: Aug. 10, 2017

(65) Prior Publication Data
US 2019/0045507 A1 Feb. 7, 2019

Related U.S. Application Data

(60) Provisional application No. 62/290,794, filed on Feb. 3, 2016.

(51) Int. Cl.
*H04W 72/04* (2009.01)
*H04W 76/14* (2018.01)
(Continued)

(52) U.S. Cl.
CPC ......... *H04W 72/0446* (2013.01); *H04W 4/40* (2018.02); *H04W 48/12* (2013.01);
(Continued)

(58) Field of Classification Search
CPC .......... H04W 72/0446; H04W 72/042; H04W 48/12; H04W 4/40; H04W 76/14; H04W 72/1268
See application file for complete search history.

(56) References Cited

U.S. PATENT DOCUMENTS

2014/0126492 A1  5/2014  Gleixner
2014/0177542 A1  6/2014  Novak et al.
(Continued)

FOREIGN PATENT DOCUMENTS

| JP | 2018524936 A | 8/2018 |
| WO | 2015094033 A1 | 6/2015 |
| WO | 2015142132 A1 | 9/2015 |

OTHER PUBLICATIONS

Unknown, Author, "SPS Scheduling for SID VoIP Packets", 3GPP TSG RAN WG2 #70bis, R2-104001, Stockholm, Sweden, Jun. 28-Jul. 2, 2010, 1-3.
(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

In one aspect, a wireless device receives, from a wireless network node, two or more semi-persistent scheduling, SPS, configurations, each of the SPS configurations defining a plurality of periodic transmission opportunities for the wireless device, at least two of the two or more SPS configurations having different periods for the periodic transmission opportunities. The wireless device then transmits data corresponding to a first traffic type or a first radio bearer according to a first one of the two or more SPS configurations and transmitting data corresponding to a second traffic
(Continued)

type or a second radio bearer according to a second one of the two or more SPS configurations.

22 Claims, 14 Drawing Sheets

(51) Int. Cl.
*H04W 72/12* (2009.01)
*H04W 4/40* (2018.01)
*H04W 48/12* (2009.01)

(52) U.S. Cl.
CPC ..... *H04W 72/042* (2013.01); *H04W 72/1268* (2013.01); *H04W 76/14* (2018.02)

(56) References Cited

U.S. PATENT DOCUMENTS

| | | | | |
|---|---|---|---|---|
| 2015/0271860 | A1* | 9/2015 | Baghel | H04W 76/14 455/426.1 |
| 2017/0019887 | A1* | 1/2017 | Jiang | H04W 72/042 |
| 2017/0071010 | A1* | 3/2017 | Lim | H04W 72/1284 |
| 2019/0116608 | A1* | 4/2019 | Kim | H04W 72/04 |
| 2019/0149279 | A1* | 5/2019 | Lee | H04W 72/042 370/329 |

OTHER PUBLICATIONS

Unknown, Author, "SPS enhancements for V2X over Uu", 3GPP TSG RAN WG2 #93bis, R2-162398, Dubrovnik, Croatia,, Apr. 11-15, 2016, pp. 1-3.

Unknown, Author, "Supporting SPS in SCG", 3GPP TSG-RAN2 #86 Meeting R2-142180, Seoul, South Korea, May 19-23, 2014, pp. 1-2.

Unknown, Author, "Traffic management and resource allocation in V2X", 3GPP TSG-RAN WG2 #91bis Tdoc R2-154669, Malmö, Sweden, Oct. 5-9, 2015, pp. 1-5.

Unknown, Author, "PC5 enhancements on resource allocation for V2V Services", 3GPP TSG RAN WG1 Meeting #83, R1-156709, Anaheim, USA, Nov. 15-22, 2015, pp. 1-5.

* cited by examiner

900

TRANSMIT, TO A WIRELESS DEVICE, TWO OR MORE SEMI-PERSISTENT SCHEDULING (SPS) CONFIGURATIONS, EACH OF THE SPS CONFIGURATIONS DEFINING A PLURALITY OF PERIODIC TRANSMISSION OPPORTUNITIES FOR THE WIRELESS DEVICE, AT LEAST TWO OF THE TWO OR MORE SPS CONFIGURATIONS HAVING DIFFERENT PERIODS FOR THE PERIODIC TRANSMISSION OPPORTUNITIES
910

RECEIVE DATA CORRESPONDING TO A FIRST TRAFFIC TYPE OR A FIRST RADIO BEARER ACCORDING TO A FIRST ONE OF THE TWO OR MORE SPS CONFIGURATIONS AND RECEIVE DATA CORRESPONDING TO A SECOND TRAFFIC TYPE OR A SECOND RADIO BEARER ACCORDING TO A SECOND ONE OF THE TWO OR MORE SPS CONFIGURATIONS
920

*FIG. 9*

EFFICIENT PERIODIC SCHEDULING FOR WIRELESS COMMUNICATIONS

TECHNICAL FIELD

The present disclosure is generally related to wireless communications networks, and is more particularly related to resource management in networks with sidelink operation, e.g., between vehicles. The techniques may be applied to semi-persistent scheduling between two nodes, more generally, including between a wireless device and a wireless network node or other wireless device.

BACKGROUND

The $3^{rd}$-Generation Partnership (3GPP) is responsible for the development and maintenance of the specifications for the $4^{th}$-generation wireless system commonly known as "Long-Term Evolution," or LTE, and more formally referred to as Evolved Universal Terrestrial Radio Access (E-UTRA) or the Evolved Universal Terrestrial Radio Access Network (E-UTRAN). During development of the Release 12 version of these specifications, the LTE standard was extended to include features to support device-to-device (D2D) communications, targeting both commercial and Public Safety applications. These D2D communications are often referred to in the LTE community as "sidelink" communications.

Some of the applications enabled by these extensions to the LTE specifications are device discovery, where devices can sense the proximity of other device and their associated applications. This is done by broadcasting and detecting discovery messages that carry device and application identities. Another application consists of direct communication between devices, based on physical channels terminated directly between the devices.

One of the potential further extensions for the device-to-device work in 3GPP includes explicit support of so-called V2X ("vehicle-to-anything") communication, which includes any combination of direct communication between vehicles, pedestrians and infrastructure. V2X communication may take advantage of a network infrastructure, when available, but at least basic V2X connectivity should be possible even in cases of lack of coverage. Providing an LTE-based V2X interface may be economically advantageous, as compared to the independent development of vehicle-to-anything interfaces, because of the LTE economies of scale. Basing these V2X on LTE may also enable tighter integration between the various types of V2X communications, such as vehicle-to-network infrastructure (V2I), vehicle-to-pedestrian (V2P) and vehicle-to-vehicle (V2V) communications, as compared to using a dedicated V2X technology.

FIG. 1 illustrates the basic scenarios for V2X communications, as integrated with an LTE network. Shown in the figure are V2V, V2P, and V2I communication links, as well as conventional network-to-user-device communications. Note that V2X communications may carry non-safety or safety information, or both, where each of the various applications and services may be associated with specific requirements sets, e.g., in terms of latency, reliability, capacity, etc.

Considerable work in vehicle-oriented communications has already been done. For example, the European Telecommunications Standards Institute (ETSI) has defined two types of messages for road safety: the Co-operative Awareness Message (CAM) and the Decentralized Environmental Notification Message (DENM).

The CAM message is intended to enable a vehicle, including an emergency vehicle, to notify others of its presence and of other relevant parameters, in a broadcast fashion. These messages target other vehicles, pedestrians, and infrastructure, and are handled in various ways by the recipients' applications. The CAM message may also serve to provide active assistance to safety driving, for normal traffic.

The availability of a CAM message is indicatively checked for every 100 milliseconds (ms), yielding a maximum detection latency requirement of <=100 ms for most messages. Note, however, that, the latency requirement for a pre-crash sensing warning is 50 ms.

The DENM message is event-triggered, such as by braking. The availability of a DENM message is also checked for every 100 ms, and the requirement of maximum latency is <=100 ms.

The package size of CAM and DENM message can vary from 100+ to 800+ bytes, with the typical size being around 300 bytes. In both cases, the transmitted messages are supposed to be detected by all vehicles in proximity.

The Society of Automotive Engineers (SAE) has also defined the Basic Safety Message (BSM) for so-called Dedicated Short-Range Communications (DSRC), with various message sizes defined. The BSMs defined by the SAE are further classified into different priorities, according to the importance and urgency of the messages.

Delay-Aware Schedulers

In order to properly exploit the available frequency resources, an eNB scheduler (in the LTE context) needs to perform resource allocation. In LTE, resource allocation decisions are taken on a transmission-time interval (TTI) granularity, which corresponds to 1 ms. Given a certain pool of available frequency resources and a particular number of user equipments (UEs) connected to the cell, the scheduler may adopt any of various scheduling strategies to assign frequency resources to such UEs. Generally, the scheduler prioritizes the UEs according to the quality-of-service (QoS) requirement of different traffic types. For example, control-plane signaling (such as Radio Resource Control, or RRC) is always prioritized over user-plane data. Additionally, different types of user-plane data may be treated differently according to the QoS identifiers (QCIs) provided during data radio bearer (DRB) establishment. For example, delay-sensitive traffic (such as that for voice-over-Internet-Protocol, or VoIP, traffic) may be subject to different scheduling policies than non-delay-sensitive traffic (such as FTP/HTTP data streaming), so that delay-sensitive traffic is more likely to be delivered so as to fulfill certain latency constraints.

As described above, V2X traffic is also expected to be a delay-sensitive and periodic type, similarly to VoIP. Accordingly, a delay-aware scheduler would be a natural implementation solution to naturally fit into the V2X framework. Among conventional delay-aware schedulers, it is worth mentioning the delay-based scheduler and the semi-persistent scheduler.

The delay-based scheduler takes as input an estimation of the time spent by a certain packet in the downlink or uplink buffer for a given UE, so that when a certain threshold is reached the packet gets higher priority and can be scheduled earlier than other packets in the buffer. To keep a better uplink buffer estimation, the delay-based scheduler in a base station may use some traffic characteristics that are known a priori for that specific DRB. For instance, for VoIP it is known that the UE generates a new VoIP packet every 20 ms.

The semi-persistent scheduler instead provides a semi-persistent resource allocation for UEs. This scheduling mechanism is specified in the 3GPP standards for LTE, and implies that the eNB uses RRC signaling to configure a UE to use semi-persistent scheduling (SPS) resources with a certain periodicity. The actual activation/release of SPS can be done dynamically via the Physical Downlink Control Channel (PDCCH), using a semi-persistent identifier referred to as the C-RNTI, where the PDCCH also indicates the frequency resources and the modulation and coding scheme to be used every n-th subframe (where n is indicated by RRC configuration of the UE). SPS can also be re-activated, meaning that a new PDCCH is transmitted carrying, for a particular SPS configuration, a different resource assignment, i.e., different time-frequency resources (e.g., LTE physical resource blocks, or PRBs), and/or a different modulation and coding scheme (MCS).

As discussed above, V2X traffic is characterized by messages with a certain typical predefined message size range and generation frequency range. However, the generation frequency and the packet size at a given time instance are not easily predictable, as they depend on a number of external factors, such as the UE's trajectory, speed, geographical position. The generation frequency and the packet size may also depend on specific V2X use case, network congestion and/or other higher layer aspects that are outside the visibility of 3GPP protocol layers or that cannot anyhow be known a priori by lower layers. Such aspects may be, for example, the periodic presence of larger packet headers, which may include, for instance, security components. This unpredictability can make the applicability of SPS or of any other delay-aware scheduler for V2X traffic inefficient, since the periodic resources need to be provisioned in a conservative way, to ensure that minimum QoS requirements are met.

SUMMARY

The detailed disclosure of various embodiments of the present invention below takes, as a baseline, the functionality of the legacy semi-persistent scheduler (SPS) specified in standards for LTE, as promulgated by 3GPP. However, it should be understood that some of the below embodiments can be applicable to other types of dynamic schedulers that do not provide semi-persistent resource allocation.

Embodiments of the present invention address the problems discussed above by implementing an interrupt-based SPS protocol, where periodic resources corresponding to different SPS configurations are provisioned in a conservative fashion by the scheduling base station (e.g., an LTE eNB), but where the use of each SPS configuration needs to be acknowledged individually by the UE, using efficient uplink signaling. The base station may reuse the unacknowledged SPS resources for other purposes. The disclosed techniques improve the performance of scheduling for V2X traffic, with better resource utilization compared to SPS and lower signaling overhead compared to dynamic scheduling. More generally, the disclosed techniques enable the eNB to configure a UE with multiple SPS configurations, each of them featuring different traffic types characterized by different periodicity, message size, and QoS requirements.

According to some embodiments, a method in a wireless device includes receiving, from a wireless network node, two or more SPS configurations. Each of the SPS configurations define a plurality of periodic transmission opportunities for the wireless device, at least two of the two or more SPS configurations having different periods for the periodic transmission opportunities. The method also includes transmitting data corresponding to a first traffic type or a first radio bearer according to a first one of the two or more SPS configurations and transmitting data corresponding to a second traffic type or a second radio bearer according to a second one of the two or more SPS configurations.

According to some other embodiments, a method in a wireless device includes receiving, from a wireless network node, an SPS configuration. The SPS configuration defines a plurality of periodic transmission opportunities for the wireless device. The method also includes receiving, from the wireless network node, information defining a periodic uplink resource for sending intent-to-use indications or no-intent-to-use indications for the SPS configuration and transmitting data according to the SPS configuration. The method further includes transmitting an intent-to-use indication prior to each transmission according to the SPS configuration, using the periodic uplink resource, or transmitting a no-intent-to-use indication prior to each transmission opportunity for the SPS configuration in which the wireless device does not transmit, using the periodic uplink resource.

According to some embodiments, a method in a wireless network node includes transmitting, to a wireless device, two or more SPS configurations. Each of the SPS configurations define a plurality of periodic transmission opportunities for the wireless device, at least two of the two or more SPS configurations having different periods for the periodic transmission opportunities. The method also includes receiving data corresponding to a first traffic type or a first radio bearer according to a first one of the two or more SPS configurations and receiving data corresponding to a second traffic type or a second radio bearer according to a second one of the two or more SPS configurations.

According to some other embodiments, a method in a wireless network node includes transmitting, to a wireless device, an SPS configuration. The SPS configuration defines a plurality of periodic transmission opportunities for the wireless device. The method also includes transmitting, to the wireless device, information defining a periodic uplink resource for the wireless device to use for sending intent-to-use indications or no-intent-to-use indications for the SPS configuration and receiving data according to the SPS configuration. The method further includes receiving an intent-to-use indication prior to each transmission according to the SPS configuration, via the periodic uplink resource, or receiving a no-intent-to-use indication prior to each transmission opportunity for the SPS configuration in which the wireless device does not transmit, via the periodic uplink resource.

According to some embodiments, an apparatus includes a radio transceiver and a processing circuit configured to control the radio transceiver and to carry out the methods described above.

According to some embodiments, a wireless device is adapted to receive, from a wireless network node, two or more SPS configurations. Each of the SPS configurations define a plurality of periodic transmission opportunities for the wireless device, where at least two of the two or more SPS configurations have different periods for the periodic transmission opportunities. The wireless device is also adapted to transmit data corresponding to a first traffic type or a first radio bearer according to a first one of the two or more SPS configurations and transmit data corresponding to a second traffic type or a second radio bearer according to a second one of the two or more SPS configurations.

According to some embodiments, a wireless device is adapted to receive, from a wireless network node, an SPS configuration defining a plurality of periodic transmission opportunities for the wireless device and information defining a periodic uplink resource for sending intent-to-use indications or no-intent-to-use indications for the SPS configuration. The wireless device is also adapted to transmit data according to the SPS configuration. The wireless device is further adapted to transmit an intent-to-use prior to each transmission according to the SPS configuration, using the periodic uplink resource, or transmit a no-intent-to-use indication prior to each transmission opportunity for the SPS configuration in which the wireless device does not transmit, using the periodic uplink resource.

According to some embodiments, a wireless network node is adapted to transmit, to a wireless device, two or more SPS configurations. Each of the SPS configurations define a plurality of periodic transmission opportunities for the wireless device, where at least two of the two or more SPS configurations have different periods for the periodic transmission opportunities. The wireless network node is also adapted to receive data corresponding to a first traffic type or a first radio bearer according to a first one of the two or more SPS configurations and receive data corresponding to a second traffic type or a second radio bearer according to a second one of the two or more SPS configurations.

According to some embodiments, a wireless network node is adapted to transmit, to a wireless device, a SPS configuration defining a plurality of periodic transmission opportunities for the wireless device and information defining a periodic uplink resource for the wireless device to use for sending intent-to-use indications or no-intent-to-use indications for the SPS configuration. The wireless network node is also adapted to receive data according to the SPS configuration. The wireless network node is further adapted to receive an intent-to-use indication prior to each transmission according to the SPS configuration, via the periodic uplink resource, or receive a no-intent-to-use indication prior to each transmission opportunity for the SPS configuration in which the wireless device does not transmit, via the periodic uplink resource.

According to some embodiments, a wireless device includes a radio transceiver and a processing circuit. The processing circuit is configured to control the radio transceiver to receive, from a wireless network node, two or more SPS configurations. Each of the SPS configurations define a plurality of periodic transmission opportunities for the wireless device, where at least two of the two or more SPS configurations have different periods for the periodic transmission opportunities. The processing circuit is also configured to control the radio transceiver to transmit data corresponding to a first traffic type or a first radio bearer according to a first one of the two or more SPS configurations and transmit data corresponding to a second traffic type or a second radio bearer according to a second one of the two or more SPS configurations.

According to some embodiments, a wireless device includes a radio transceiver and a processing circuit. The processing circuit is configured to control the radio transceiver to receive, from a wireless network node, an SPS configuration defining a plurality of periodic transmission opportunities for the wireless device and information defining a periodic uplink resource for sending intent-to-use indications or no-intent-to-use indications for the SPS configuration. The processing circuit is also configured to control the radio transceiver to transmit data according to the SPS configuration. The processing circuit is further configured to control the radio transceiver to transmit an intent-to-use indication prior to each transmission according to the SPS configuration, using the periodic uplink resource, or transmit a no-intent-to-use indication prior to each transmission opportunity for the SPS configuration in which the wireless device does not transmit, using the periodic uplink resource.

According to some embodiments, a wireless network node includes a radio transceiver and a processing circuit. The processing circuit is configured to control the radio transceiver to transmit, to a wireless device, two or more SPS configurations. Each of the SPS configurations define a plurality of periodic transmission opportunities for the wireless device, where at least two of the two or more SPS configurations have different periods for the periodic transmission opportunities. The processing circuit is also configured to control the radio transceiver to receive data corresponding to a first traffic type or a first radio bearer according to a first one of the two or more SPS configurations and receive data corresponding to a second traffic type or a second radio bearer according to a second one of the two or more SPS configurations.

According to some embodiments, a wireless network node includes a radio transceiver and a processing circuit. The processing circuit is configured to control the radio transceiver to transmit, to a wireless device, an SPS configuration defining a plurality of periodic transmission opportunities for the wireless device and information defining a periodic uplink resource for the wireless device to use for sending intent-to-use indications or no-intent-to-use indications for the SPS configuration. The processing circuit is also configured to control the radio transceiver to receive data according to the SPS configuration. The processing circuit is further configured to control the radio transceiver to receive an intent-to-use indication prior to each transmission according to the SPS configuration, via the periodic uplink resource, and receive a no-intent-to-use indication prior to each transmission opportunity for the SPS configuration in which the wireless device does not transmit, via the periodic uplink resource.

Other embodiments include computer program products, computer readable medium and functional module implementations that carry out the method described above.

BRIEF DESCRIPTION OF THE FIGURES

FIG. 9 is a process flow diagram illustrating a method carried out in the wireless network node, according to some embodiments.

DETAILED DESCRIPTION

Figure 1:
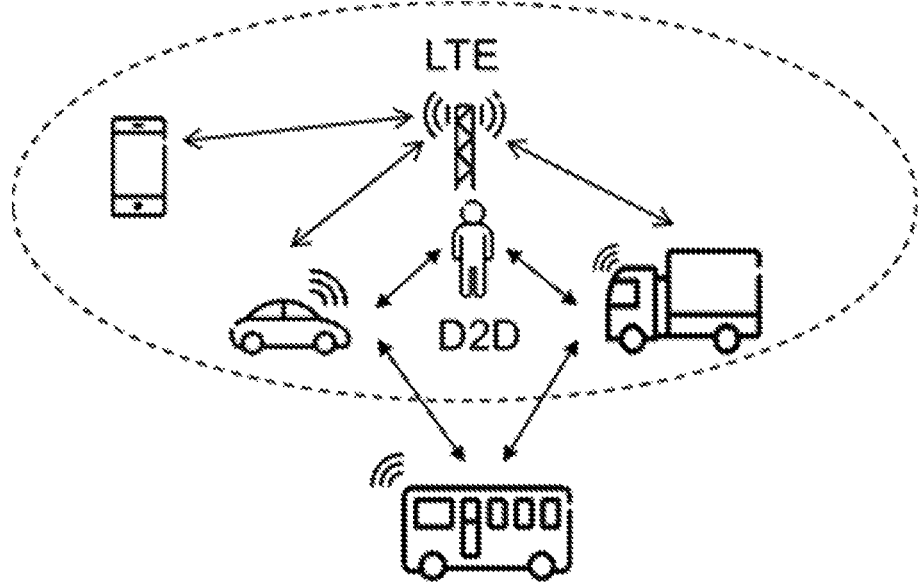
FIG. 1 illustrates basic scenarios for V2X communications, as integrated with an LTE network.

The following techniques and apparatuses are described in the context of V2X communications, and in some cases, may be described using terminology that is particular to LTE standards. It should be appreciated, however, that the disclosed embodiments may be applied to any traffic with similar characteristics, and/or in other wireless systems. The service may be provided over a cellular link or over a direct link, such as a sidelink or D2D link.

The detailed embodiments discussed herein provide particular advantages for traffic that has some periodic component, such as CAM traffic for ITS, which has a maximum frequency generation of 10 Hz and packets typically between 190-300 bytes. The techniques may be used more generally, however.

Legacy cellular SPS (semi-persistent scheduling) comprises a first configuration step where parameters for the periodic resource allocation are signaled from the eNB to the involved UE. An activation/deactivation step follows, where the actual DL/UL SPS starts/ends. The UEs receive/transmit data according to the SPS configuration for as long as SPS is active.

Several example embodiments of the presently disclosed techniques are detailed below, and are categorized as "Example Technique 1," "Example Technique 2," etc. It should be understood that embodiments applying several of these techniques may be used together, unless it is clear from the circumstances that a given combination is not suitable.

Example Technique 1: Multiple SPS Configurations

According to a first example technique, a new SPS protocol and procedure are defined. The scheduled data transmission may occur in the uplink (UE to eNB or other access point), for example, while the control signaling may be between the UE and possibly a combination of an eNB/access point or another UE or control node. For simplicity, the technique is described for the scheduling of the uplink, in the following, with both control and user planes terminated between a UE and eNB. The techniques may be applied more generally, however.

According to this technique, multiple SPS configurations may be configured for the UE by the eNB via, for example, RRC signaling to the UE. Each of these configurations may correspond to a different SPS periodicity, for example, and/or to a different resource allocation including frequency resources, modulation and coding scheme, nominal power and other SPS related parameters. With this approach, each individual SPS configuration may be tailored for a specific type of traffic, for example. For instance, consider a UE that is running, in parallel, two V2X services of different types, where the two V2X services produce traffic with different periodicities. In this case, having two SPS configurations is beneficial—otherwise the eNB would be repeatedly releasing one SPS configuration and activating a new one or the eNB would be limited to configuring the UE with a single SPS configuration that is time aligned with the traffic for only one of the two services.

Each SPS configuration can be associated to a specific V2X traffic type. For example, assuming that a V2X traffic type is identified at lower layers with a certain identifier, such as a Logical Channel Identifier (LCID), the eNB may associate each SPS configuration to one or more specific identifiers, so that the UE will use the SPS configuration corresponding to the identifier for the packet to be sent. Alternatively, the UE may fill the SPS uplink grant by serving packets in order of logical channel priority, in some embodiments. Note that instead of an LCID, other packet markers in higher layers (e.g., PDCP, IP) may be used to associate an SPS configuration with a V2X traffic type.

In the LTE context, each SPS configuration is activated/released by the eNB via the Physical Downlink Control Channel (PDCCH). In particular, each SPS configuration is associated by the eNB with an index. Such index is addressed by an "SPS indicator field" contained in a certain PDCCH format, whenever the corresponding SPS configuration needs to be activated/released or reactivated with another allocation of frequency resources, modulation and coding scheme, etc.

The multiple SPS configurations for a UE may also or instead include one or more SPS configurations to be used over the sidelink. In this case, the SPS configuration(s) to be used over the sidelink interface (e.g., the PC5 interface) can either be signaled together with the SPS configuration(s) to be used over the UE-to-eNB interface (e.g., the Uu interface). In such a case, special indexes are reserved for the sidelink SPS configuration. SPS configurations to be used over the sidelink interface can also be configured separately, e.g., in another information element in the RRC signaling. For activation/release of sidelink SPS configuration via PDCCH command, the same mechanisms described above can be applied. In particular, the same PDCCH command used for Uu can be also used for sidelink; alternatively, the activation/release of sidelink and Uu SPS configurations are commanded over different PDCCHs (i.e., in different downlink control information (DCI) messages).

Example Technique 2: Acknowledged Periodic Transmissions

In other embodiments of the presently disclosed techniques, the UE explicitly reports to the eNB which of one or more SPS configurations configured by the eNB is intended, by the UE, to be used. Note that this technique may be combined with any of the techniques described above under the heading "Example Technique 1: Multiple SPS configurations."

Figure 2:
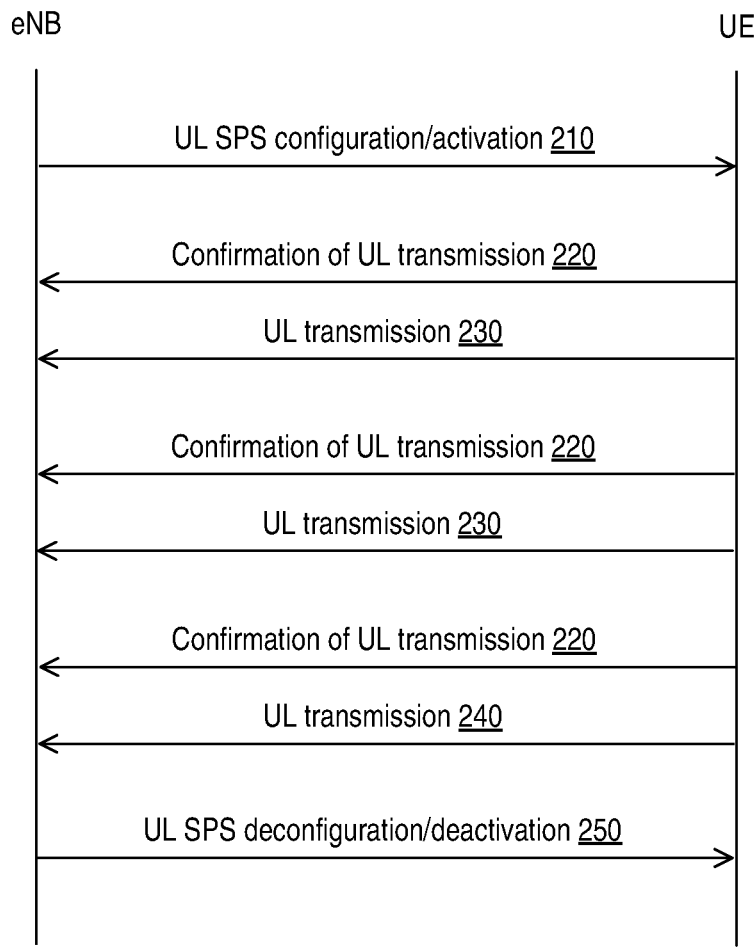
FIG. 2 illustrates a signal diagram of uplink (UL) SPS, according to some embodiments.

In a first step, according to this approach, the scheduler node (e.g., an eNB) allocates a set of periodic data plane resources and a set of control plane resources to a UE. This is shown in FIG. 2, as signal 210. The control plane resources are intended to be used by the UE for notifying the eNB each time it intends to initiate a specific data transmission that maps to a particular traffic type, e.g., as identified by a specific LCID. As a special case, the two resource allocations may be coupled, such that, for example, some or all of the control plane transmission parameters or resources are implicitly obtained from the configuration of the associated data transmissions.

The mapping between the control resources and corresponding data resources does not need to be a 1:1 mapping. For example, a single control resource may be associated with multiple data resources. Scheduling can be done in a single step or with multiple sub steps and protocol messages, such as SPS configuration and activation/release messages.

Accordingly, each of the multiple SPS configurations described above in Example Technique 1 may include both configuration of a periodic data-plane uplink transmission (e.g., via the Physical Uplink Shared Channel, or PUSCH) and also configuration of associated periodic control-plane uplink transmissions (e.g., via the Physical Uplink Control Channel, or PUCCH). The configuration identifies a set of periodic radio resources (e.g., subframes) and possibly other transmission parameters.

The activation/release steps may be common for the data and control planes, or individual for each. Note that, depending on specific protocol details, activation of data plane and control plane resources can be done already at SPS configuration.

In a second step, prior to an uplink data transmission, the UE signals to the eNB the UE's intention to use the associated data resource(s) for the data transmission. This is shown as signal 220 in FIG. 2, and is done using the periodic uplink control-plane resources. For instance, in the event that the usage of a certain SPS configuration is restricted to a certain LCID (or other packet markers included in higher layers (e.g. PDCP, IP)), the UE can signal its intention to use such an LCID, thereby indicating the intention to use the corresponding SPS configuration. Alternatively, the intention to transmit may be signaled with a flag acknowledging the associated uplink transmission. Such a flag may be the index of the preferred SPS configuration selected by the UE, for example. Other solutions are also possible—for example, the UE may provide, over the control plane, an indication of the current UE buffer size. Another option is that this signaling is done using a specific scheduling request (SR) resource that is associated to each SPS configuration, to indicate intended usage of that configuration. Another control resource may be used to signal the intention of the UE to stop using a specific SPS resource, in some embodiments.

Therefore, in addition to being able to correctly transmit and interpret the signaling associated to the above protocol, the UE is expected to determine its intention to transmit and to signal it at step 220. A determination of whether to transmit is made by, e.g., determining whether the transmission buffer for the associated data channel is above some threshold (to start using a certain SPS resource) or below some threshold (to stop using a certain SPS resource). The UE signals its intention ahead of time, e.g., one subframe or more ahead of time.

In a third step, if the UE signaled its intention to transmit, uplink transmission in the associated uplink resources will follow, as shown as signal 230 in FIG. 2. Otherwise, there will be no uplink transmission in the associated uplink data resource(s). In some embodiments, the UE should wait for an acknowledgement of the signaled intention to transmit, before using the SPS resource, while in others it may simply transmit on the intended SPS resource after signaling its intent to do so.

The procedure for steps 220-230 is repeated for all the SPS resources allocated by the scheduler node. Thus, for example, the steps 220 and 230 may be repeated for each of several different traffic types, where the different traffic types are associated with different SPS resource configurations.

Figure 3:
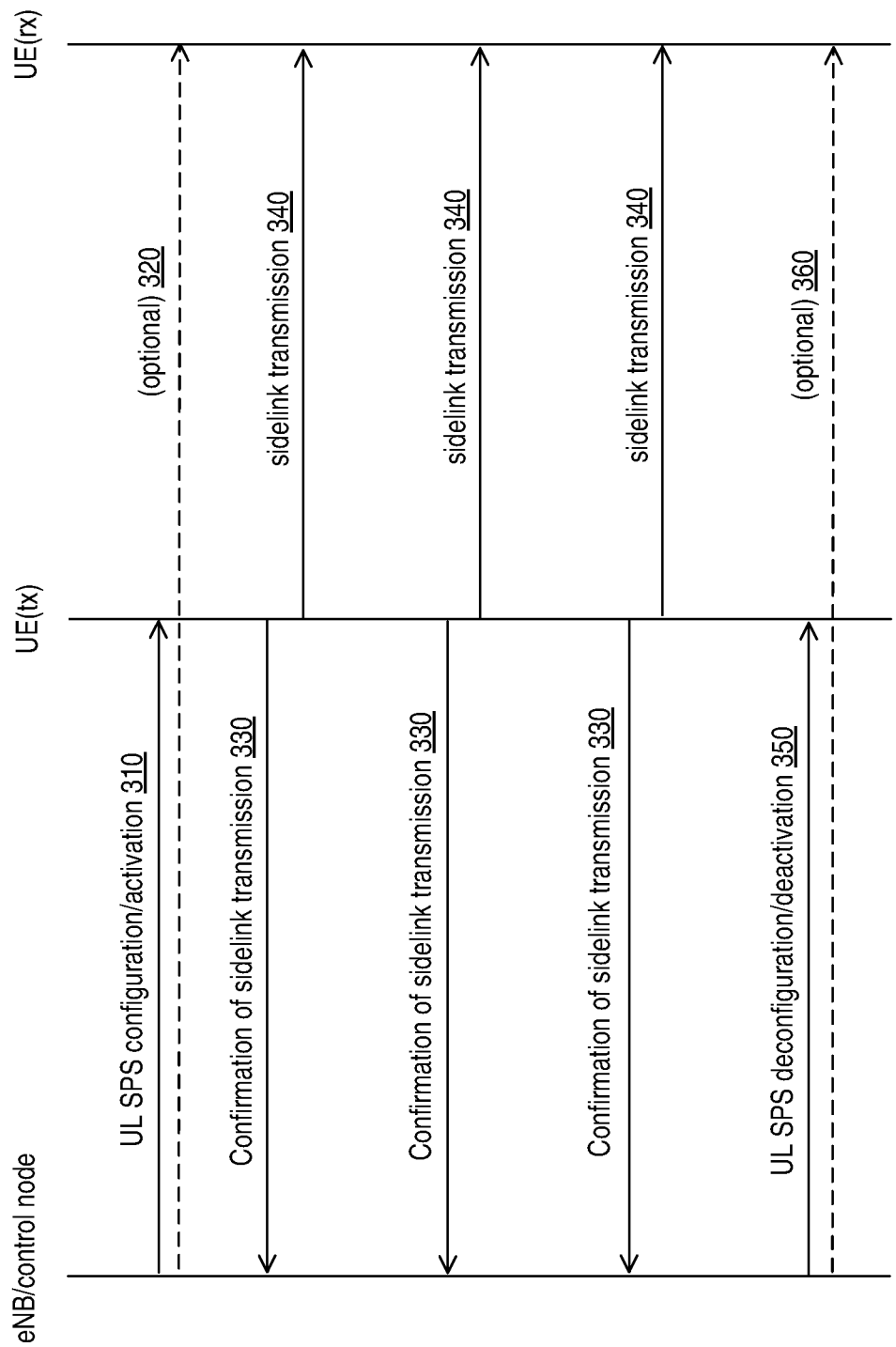
FIG. 3 illustrates a signal diagram of UL SPS for sidelink transmission, according to some embodiments.

FIG. 3 illustrates how the technique described may be applied to sidelink transmissions. As shown with signal 310, the scheduler node (e.g., an eNB) allocates a set of periodic data plane resources and a set of control plane resources to a UE, shown in FIG. 3 as UE(tx). Once again, the control plane resources are intended to be used by the UE for notifying the eNB each time it intends to initiate a specific data transmission that maps to a particular traffic type, e.g., as identified by a specific LCID. The data plane resources, however, are for sidelink transmissions to another UE, shown in FIG. 3 as UE(rx). Again, as a special case, the two resource allocations may be coupled, such that, for example, some or all of the control plane transmission parameters or resources are implicitly obtained from the configuration of the associated data transmissions. In some embodiments, as shown with signal 320, the scheduler may also signal the other UE, i.e., UE(rx), with information regarding at least the allocation of periodic data plane resources.

Prior to a sidelink data transmission, the UE signals to the eNB the UE's intention to use the associated data resource(s) for the sidelink data transmission. This is shown as signal 330 in FIG. 3, and is done using the periodic uplink control-plane resources. Again, in the event that the usage of a certain SPS configuration is restricted to a certain LCID (or other packet markers included in higher layers (e.g. PDCP, IP)), the UE can signal its intention to use such an LCID, thereby indicating the intention to use the corresponding SPS configuration. Alternatively, the intention to transmit may be signaled with a flag acknowledging the associated sidelink transmission. Such a flag may be the index of the preferred SPS configuration selected by the UE.

Finally, if the UE signaled its intention to transmit, sidelink transmission in the associated sidelink resources will follow, as shown with signal 340 in FIG. 3. Otherwise, there will be no sidelink transmission in the associated data resource(s). In some embodiments, the UE should wait for an acknowledgement, from the eNB, of the signaled intention to transmit, before using the SPS resource, while in others it may simply transmit on the intended SPS resource after signaling its intent to do so. Signals 330 and 340 may be repeated several times, as shown in FIG. 3. The eNB may also deconfigure or deactivate one or more of the SPS configurations, as shown with signal 350; the eNB may, in some embodiments, also inform the receiving UE, i.e., UE(rx), of the deactivation, as shown with signal 360.

Example Technique 3: Acknowledgement Signaling Details

The actual control signaling from the UE to the eNB can be achieved in different ways. In a first example, in the LTE context, the UE sends control information using the Physical Uplink Shared Channel (PUSCH) physical channel. The control information may be encoded as Radio Resource Control (RRC) control information. This solution has the flexibility of accommodating relatively complex signaling from the UE, but it consumes at least one physical resource block (PRB) per UE per signaling event, and it requires the eNB to schedule the UE for the transmission of the control signaling.

In a second example, the Physical Uplink Control Channel (PUCCH) physical channel is used for sending control information at step 220. PUCCH carries limited control payload compared to PUSCH, but it has higher multiplexing capacity, on a limited number of resources, and can be sent by the UE at certain time periods without being scheduled by the eNB.

In one example the transmission format of PUCCH format 1 is reused for this purpose, but of course, the meaning of the control signaling is interpreted accordingly.

The eNB may configure the resources for PUCCH UL control transmission at step 220, to avoid overlap with other PUCCH resources and in order to minimize interference and control the control channel load. The eNB and the UE may even determine and use a different scrambling sequence, demodulation reference signal (DMRS) sequence/orthogonal cover code (OCC), or any other L1 transmission parameter for the PUCCH format used for indicating the intention to transmit UL according to step 220.

In one example, the UE signals at step 220 only in the event that it does not intend to transmit on the associate uplink (or sidelink) resource, for a given transmission opportunity according to a particular SPS. This approach provides improved protection against misdetection of control signaling at the eNB.

The above mechanism can be easily extended by person skilled in the art to the sidelink, such as with signal 330 of FIG. 3.

The eNB may need, of course, to correctly transmit and interpret the control signaling described above. In the event that the protocol for the control signaling is specified in such a way that the UE transmits uplink control information at step 220, as described above, only in those instances where it does not intend to transmit in the uplink (or sidelink) for a given transmission opportunity, the eNB will assume that the UE will transmit in the uplink (or in the sidelink) if it does not correctly detect any control signaling from the UE according to step 220.

In the event that the eNB determines that a UE is not intending to transmit on certain configured data resources, the eNB may schedule other transmissions on such resources. Otherwise, the eNB will refrain from using those data resources for other transmission.

SPS Activation Rules

As an aspect of several of the techniques described above, it will be appreciated that various rules for activating a specific SPS configuration may be defined. For example, the eNB may configure an SPS configuration when a certain data radio bearer (DRB) with a specific LCID, corresponding to a certain V2X traffic type, is established. The SPS configuration will be tailored to the specific traffic characteristics carried by the DRB as described above, in the discussion of Technique 1.

The dynamic activation or release of a specific SPS resource may be done at any time by the eNB, by, for instance, using a specific format of a PDCCH message. The eNB may activate a specific SPS resource based on either an explicit indication from the UE or based on traffic being sent on a specific LCID. Rather than on an LCID, the activation mechanism can be based on higher-layer packet markers (e.g., packet markers for the PDCP or IP layers).

The above mechanisms can be easily extended by person skilled in the art to the sidelink, i.e., such that the UE requests resources to be used for V2X purposes, in which case the UE may signal to the eNB which specific V2X traffic type the UE would like to execute over the sidelink. The eNB configures the proper SPS configuration accordingly.

SPS Release Rules

As an aspect of several of the techniques described above, it will be appreciated that various rules for rules to release the SPS configuration may be defined. Release can be explicit, for instance by sending a release command using PDCCH, or implicit.

The UE and the eNB may implicitly release SPS, for example, if for an LCID associated with the active SPS resource, no traffic has been sent by the UE for a specific time or for a specific number of UL transmissions.

The eNB may explicitly deactivate a specific SPS resource based on either an indication from the UE or based on traffic being absent for a specific LCID for a certain time or for a certain number of UL transmissions.

Another possible rule the eNB can use for explicit release is when eNB recognizes that certain V2X traffic (with a certain characteristic, e.g., periodicity, QoS, message size) has been terminated at the application client of the UE. The UE could assist the eNB in determining that a V2X traffic is terminated by sending a Medium Access Control Protocol Data Unit (MAC PDU) containing a flag indicating that traffic for a specific LCID has terminated. Such information can be brought for instance over a MAC Control Element (CE) indicating that the traffic running over the LCID of the corresponding MAC PDU is terminated. Such a MAC CE can be sent either together with a MAC PDU containing data or just padding.

The above mechanism can be easily extended by person skilled in the art to the sidelink, i.e., such that the UE informs the eNB that a certain V2X traffic type is terminated over the sidelink, and the eNB releases the SPS configuration accordingly.

Note that the details described here can also be generalized and applied to any type of scheduler. For instance, if a certain scheduler algorithm is used for the traffic associated with a certain LCID, as soon as the traffic over that LCID is declared terminated, the UE could use this information to change scheduler policy. As an example, there might be a non-SPS scheduler that simply dynamically tries to schedule the UE periodically every 20 ms. Upon receiving such info (i.e., an indication that a certain V2X traffic type is terminated, sent according to any of the mechanisms described above) the scheduler stops doing that.

SPS Re-Activation Rule

SPS re-activation rules based on assistance information from the UE may also be defined. Reactivating an SPS configuration might be needed whenever the previous resource allocation (e.g. PRB allocation, modulation and coding schemer (MCS)) is deemed not suitable anymore. For instance, it can happen that some packets may be sometimes larger than others, even if they have same traffic characteristics (e.g. periodicity, QoS class identifier (QCI)) and belong to the same DRB. For example, in V2X, some packets might contain larger security headers that could significantly increase the overall packet size. In V2X the presence of such a security component in the packet header is also periodic. Unfortunately, the eNB might not be aware of when the larger security component will be transmitted.

To assist the eNB in properly adapting the SPS grant, the UE may, in some embodiments, inform an eNB in advance of when a packet larger than the current SPS grant size will be transmitted. For instance, if the transmission of a larger packet containing security overhead is periodic, the UE can inform the eNB, in a previous message, that the next message will be larger. The UE might signal this information via a flag contained in the Medium Access Control (MAC) Protocol Data Unit (PDU), e.g., in a MAC Control Element (CE), of the last message prior to the transmission of the larger packet. Rather than a flag, the UE could directly report the expected size of the next message if possible. Upon receiving such information, the eNB reactivates the SPS configuration with another grant size or simply provides for that Transmission Time Interval (TTI) a new dynamic UL grant overriding the previously activated SPS.

This technique can also be generalized to any type of scheduler, e.g., if a non-semi persistent scheduler is used, the indication reported by the UE will be used to change the resource allocation mechanism for that specific traffic.

The above mechanism can be easily extended by person skilled in the art to the sidelink, i.e., the UE informs the eNB that a certain V2X traffic type has changed over the sidelink. Upon receiving such information, the eNB reactivates the SPS configuration with another grant size valid for the sidelink or it simply provides, for that TTI, a new dynamic sidelink grant overriding the previously activated SPS sidelink grant.

Example Methods

Figure 4:
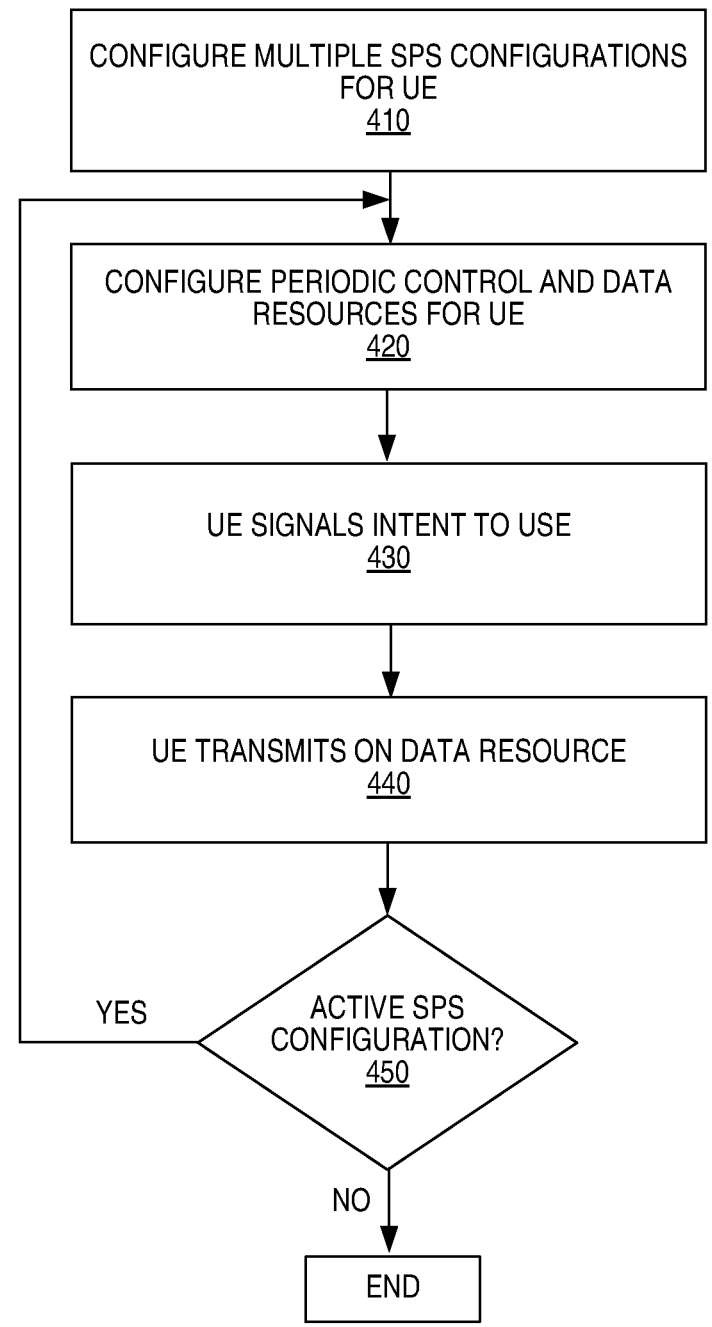
FIG. 4 illustrates an example protocol for allocating periodic resources for transmission by a device, according to some embodiments.

In view of the details provided above, it will be appreciated that some embodiments of the presently disclosed techniques involve a protocol for allocating periodic resources for transmission by a device, comprising the steps illustrated in FIG. 4. As shown at block 410, the illustrated process begins with an eNB (or other control node) configuring multiple SPS configurations for a UE. As shown at block 420, the eNB also configures corresponding periodic control and data resources for UE transmission. As shown at block 430, the UE signals, to the eNB, the UE's intent to transmit uplink (or sidelink) in the associated data resource(s) for a particular SPS configuration; at block 440, the UE then transmits on those data resources. Note that in some embodiments this may be in response to an acknowledgement (not shown) of the UE's signaled intent, sent by the eNB.

As indicated in FIG. 4, some or all of the steps shown at blocks 420, 430 and 440 may be repeated for each repetition of periodic control/data resources allocation, for each SPS configuration. The repetition may be based on a determination that the SPS configuration is active, such as shown by decision block 450. The process may be terminated, for one or more SPS configurations, by the sending of a deactivation or release message by the eNB, in some embodiments. In some embodiments, this deactivation/release may be based on UE assistance, such as an indication from the UE that a particular type of data traffic or a particular V2x application is being terminated.

Example Implementations

Figure 5:
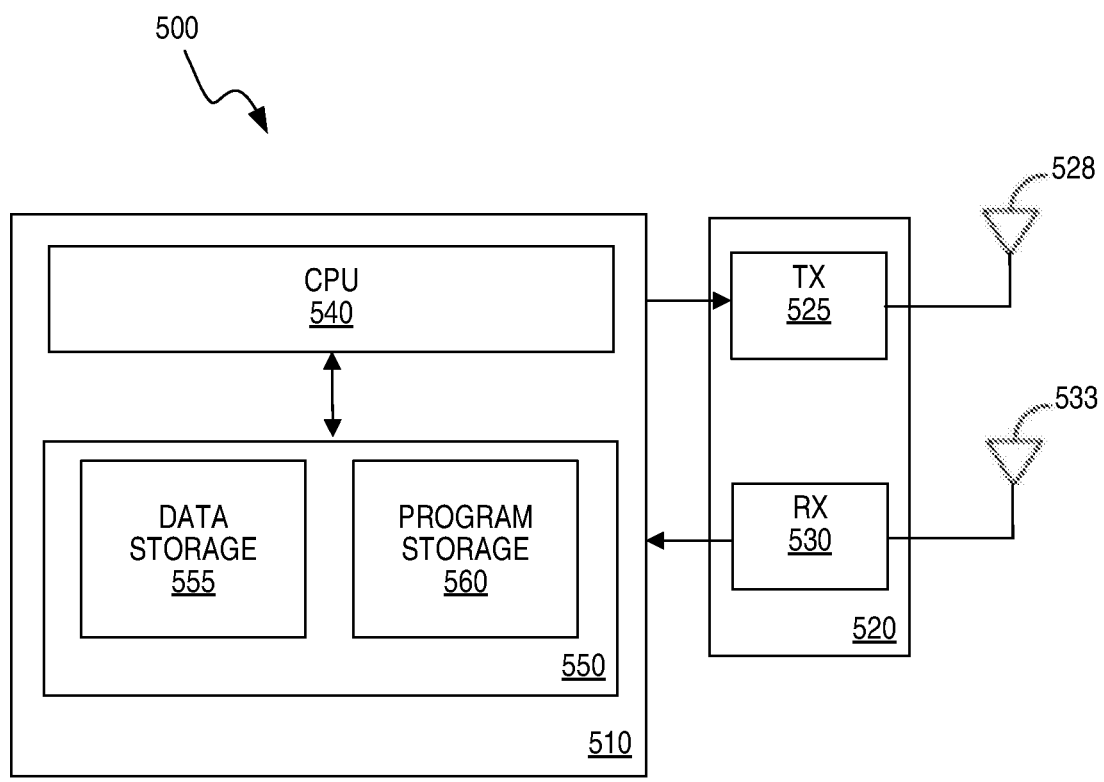
FIG. 5 is a block diagram illustrating components of an example wireless device, according to some embodiments.

Various techniques described herein may be implemented by radio transceiver circuitry and electronic data processing circuitry provided in a wireless device. FIG. 5 illustrates features of an example wireless device 500. In various embodiments, the non-limiting term UE is used. In other instances, the terms "communication device," "wireless device," "mobile terminal," or "mobile station" may be used. For purposes of understanding the presently disclosed techniques and apparatus, these terms may be considered to be interchangeable. A UE or communication device described herein can be any type of wireless device capable of communicating with a network node or with another communication device over radio signals. Such a device may include any device used for various types of V2X communications, such as vehicle-to-network infrastructure (V2I), vehicle-to-pedestrian (V2P), and vehicle-to-vehicle (V2V) communications. Such a device may also be known as a device-to-device (D2D) UE, a machine-type UE or UE capable of machine-to-machine communication (M2M), a sensor equipped with a UE, a wireless-enabled tablet computing device, a mobile terminal, a smart phone, a laptop embedded equipped (LEE), a laptop-mounted equipment (LME), a USB dongle, a Customer Premises Equipment (CPE), etc.

Various embodiments are described in the context of the LTE radio access network (RAN), as specified by 3GPP. However, it should be understood that the techniques and apparatus may be applicable to any radio access technology (RAT), V2X technology or multi-RAT system.

Wireless device 500, such as a UE configured for operation with an LTE network (E-UTRAN), includes a transceiver unit 520 for communicating with one or more base stations (eNBs) and for communicating directly with one or more other wireless devices, as well as a processing circuit 510 for processing the signals transmitted and received by the transceiver unit 520. Transceiver unit 520 includes a transmitter 525 coupled to one or more transmit antennas 528 and a receiver 530 coupled to one or more receiver antennas 533. The same antenna(s) 528 and 533 may be used for both transmission and reception. Receiver 530 and transmitter 525 use known radio processing and signal processing components and techniques, typically according to a particular telecommunications standard such as the 3GPP standards for LTE. Note also that the transceiver unit 520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques described herein, additional details are not shown here.

Processing circuit 510 comprises one or more processors (CPUs) 540 coupled to one or more memory devices 550 that make up a data storage memory 555 and a program storage memory 560. Processor 540 may be a microprocessor, microcontroller, or digital signal processor, in some embodiments. More generally, processing circuit 510 may comprise a processor/firmware combination, or specialized digital hardware, or a combination thereof. Memory 550 may comprise one or several types of non-transitory memory such as read-only memory (ROM), random-access memory, cache memory, flash memory devices, optical storage devices, etc. If wireless device 500 supports multiple radio access technologies, processing circuit 510 may include separate processing resources dedicated to one or several radio access technologies, in some embodiments.

Typical functions of the processing circuit 510 include modulation and coding of transmitted signals and the demodulation and decoding of received signals. In several embodiments, processing circuit 510 is configured, using suitable program code stored in program storage memory 560, for example, to carry out relevant embodiments described herein. Thus, for example, the processing circuit 510 is configured to receive, from a wireless network node, two or more SPS configurations. Each of the SPS configurations define a plurality of periodic transmission opportunities for the wireless device, at least two of the two or more SPS configurations having different periods for the periodic transmission opportunities. The processing circuit 510 is also configured to transmit data corresponding to a first traffic type or a first radio bearer according to a first one of the two or more SPS configurations and transmit data corresponding to a second traffic type or a second radio bearer according to a second one of the two or more SPS configurations.

In other embodiments, the processing circuit 510 is configured to receive, from a wireless network node, an SPS configuration. The SPS configuration defines a plurality of periodic transmission opportunities for the wireless device. The processing circuit 510 is configured to receive, from the wireless network node, information defining a periodic uplink resource for sending intent-to-use indications or no-intent-to-use indications for the SPS configuration and transmit data according to the SPS configuration. The processing circuit 510 is also configured to transmit an intent-to-use indication prior to each transmission according to the SPS configuration, using the periodic uplink resource, or transmit a no-intent-to-use indication prior to each transmission opportunity for the SPS configuration in which the wireless device does not transmit, using the periodic uplink resource.

Figure 6:
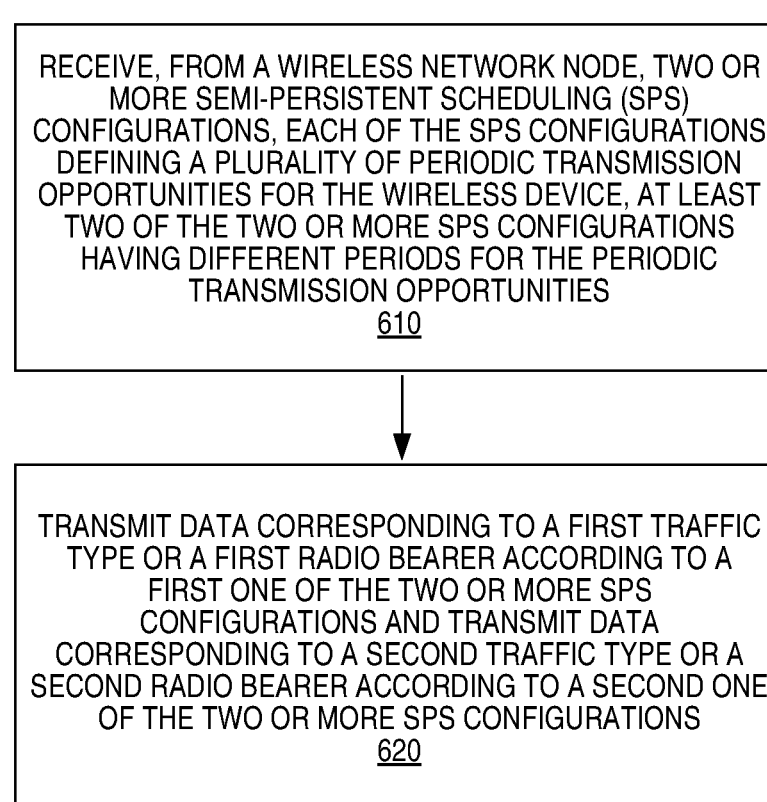
FIG. 6 is a process flow diagram illustrating a method carried out in the wireless device, according to some embodiments.

FIG. 6 illustrates a method 600 in the wireless device 500. The method 600 includes receiving, from a wireless network node, two or more SPS configurations (block 610). Each of the SPS configurations define a plurality of periodic transmission opportunities for the wireless device, at least two of the two or more SPS configurations having different periods for the periodic transmission opportunities. The method 600 also includes transmitting data corresponding to a first traffic type or a first radio bearer according to a first one of the two or more SPS configurations and transmitting data corresponding to a second traffic type or a second radio bearer according to a second one of the two or more SPS configurations (block 620).

The method 600 may also include receiving, from the wireless network node, information defining, for each of the two or more SPS configurations, a periodic uplink resource for sending intent-to-use indications or no-intent-to-use indications for the corresponding SPS configuration. The uplink resources that are periodic may include data plane resources (e.g., PUSCH) and/or control plane resources (e.g., PUCCH). The information defining the periodic uplink resource for each of the two or more SPS configurations may be received with the two or more SPS configurations. In some cases, the method 600 includes transmitting an intent-to-use indication prior to each transmission according to the first one of the two or more SPS configurations, using the periodic uplink resource corresponding to the first one of the two or more SPS configurations. The intent-to-use indication may be sent in a first transmission-time interval, which immediately precedes a second transmission-time interval carrying the transmission according to the first one of the two or more SPS configurations.

In some embodiments, the method 600 includes transmitting a no-intent-to-use indication prior to each transmission opportunity for the first one of the two or more SPS configurations in which the wireless device does not transmit, using the periodic uplink resource corresponding to the first one of the two or more SPS configurations. The no-intent-to-use indication may be sent in a first transmission-time interval, which immediately precedes a second transmission-time interval containing the transmission opportunity according to the first one of the two or more SPS configurations.

In some embodiments, the transmitting of data according to the first and second SPS configurations is performed as uplink transmissions to the wireless network node. In other embodiments, they are performed as sidelink transmissions to a second wireless network node. Note that here and elsewhere herein, sidelink transmissions may be any type of direct device-to-device transmissions, and are not necessarily limited to links that are specifically called "sidelinks."

The method 600 may include associating the data of the first traffic type or the first radio bearer to the first one of the two or more SPS configurations according to a LCID corresponding to the first traffic type or the first radio bearer. The received SPS configurations may each be identified with a corresponding LCID. In some cases, the intent-to-use indications or no-intent-to-use indications identify the LCID corresponding to the respective SPS configuration.

Figure 7:
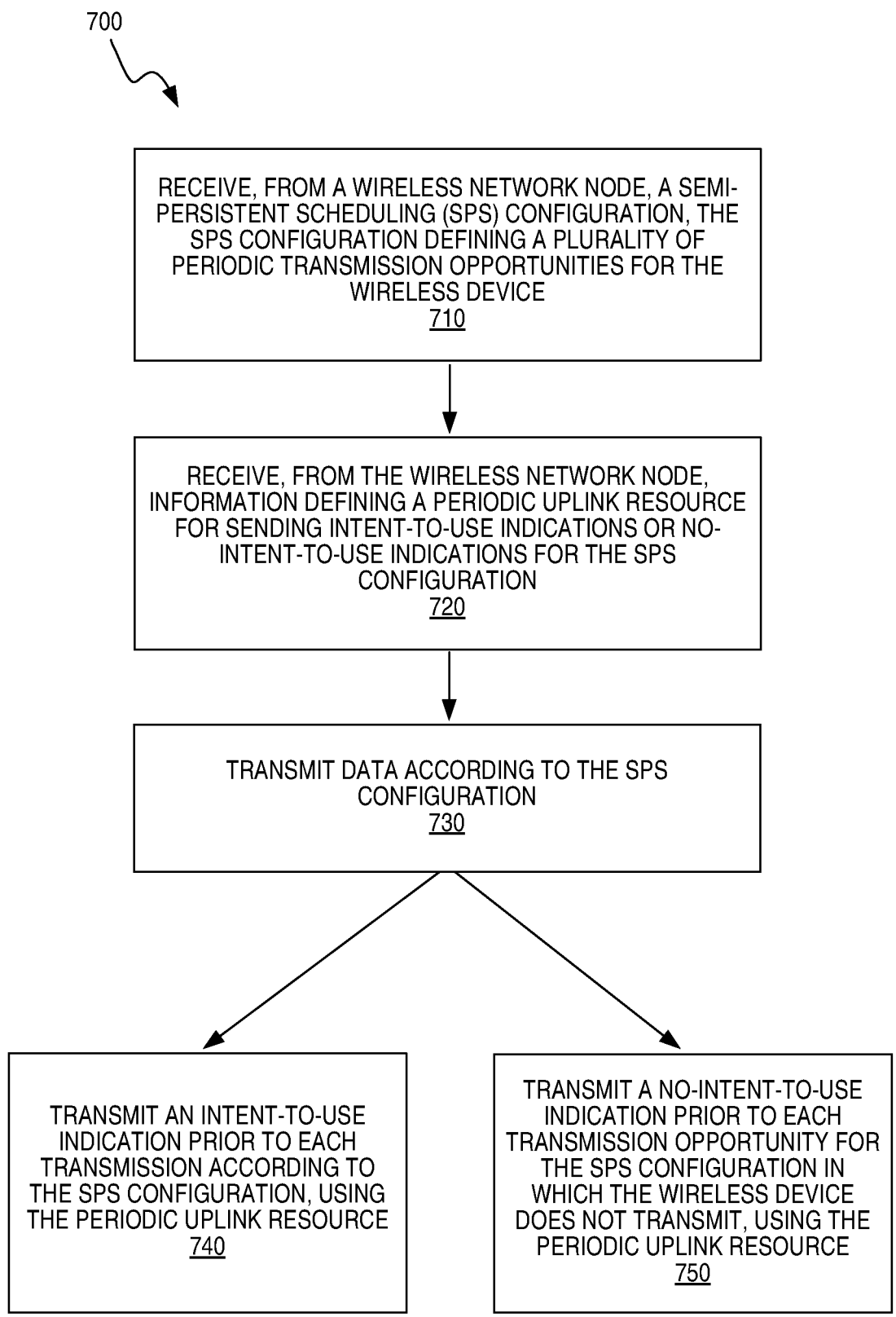
FIG. 7 is a process flow diagram illustrating another method carried out in the wireless device, according to some embodiments.

FIG. 7 illustrates a method 700 in the wireless device 500 that includes receiving, from a wireless network node, an SPS configuration. The SPS configuration defines a plurality of periodic transmission opportunities for the wireless device (block 710). The method 700 also includes receiving, from the wireless network node, information defining a periodic uplink resource for sending intent-to-use indications or no-intent-to-use indications for the SPS configuration (block 720) and transmitting data according to the SPS configuration (block 730). The method 700 further includes transmitting an intent-to-use indication prior to each transmission according to the SPS configuration, using the periodic uplink resource (block 740), or transmitting a no-intent-to-use indication prior to each transmission opportunity for the SPS configuration in which the wireless device does not transmit, using the periodic uplink resource (block 750). The information defining the periodic uplink resource for the SPS configuration may be received with the SPS configuration. The transmitting of data may be performed as uplink transmissions to the wireless network node or sidelink transmissions to a second wireless device.

Figure 8:
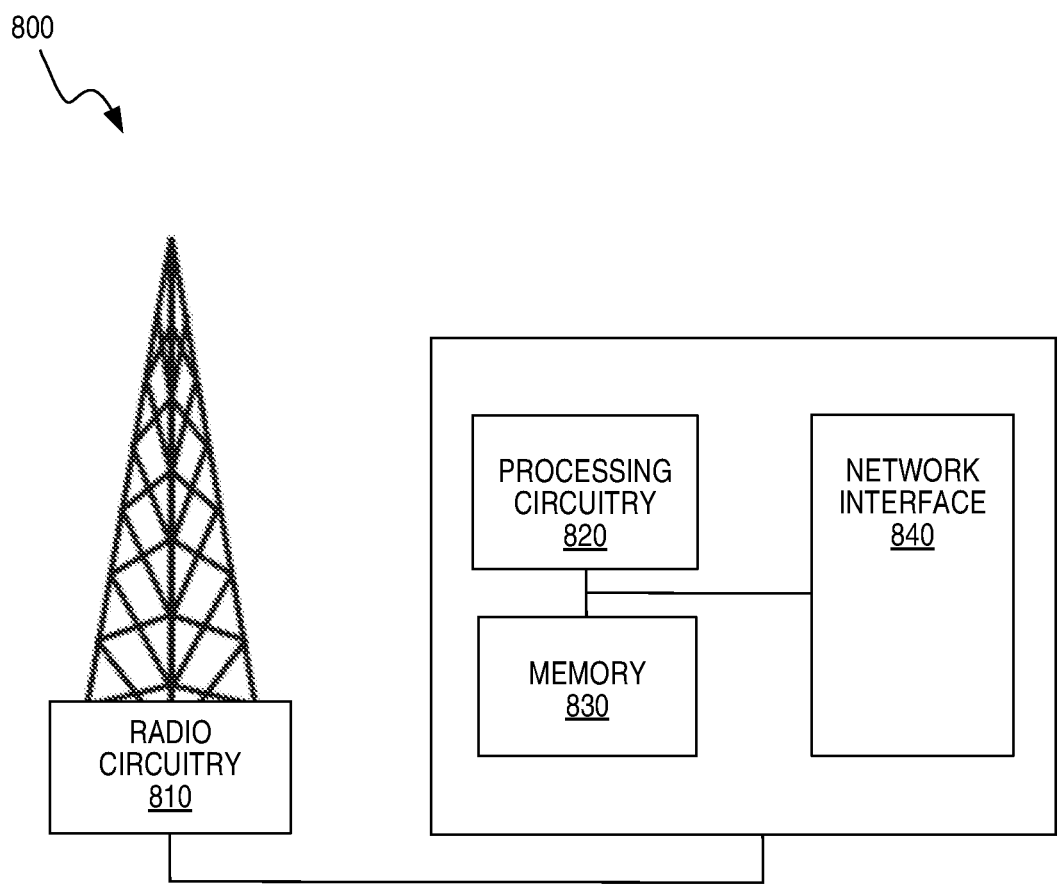
FIG. 8 is a block diagram illustrating components of an example wireless network node, such as a base station, according to some embodiments.
Figure 10:
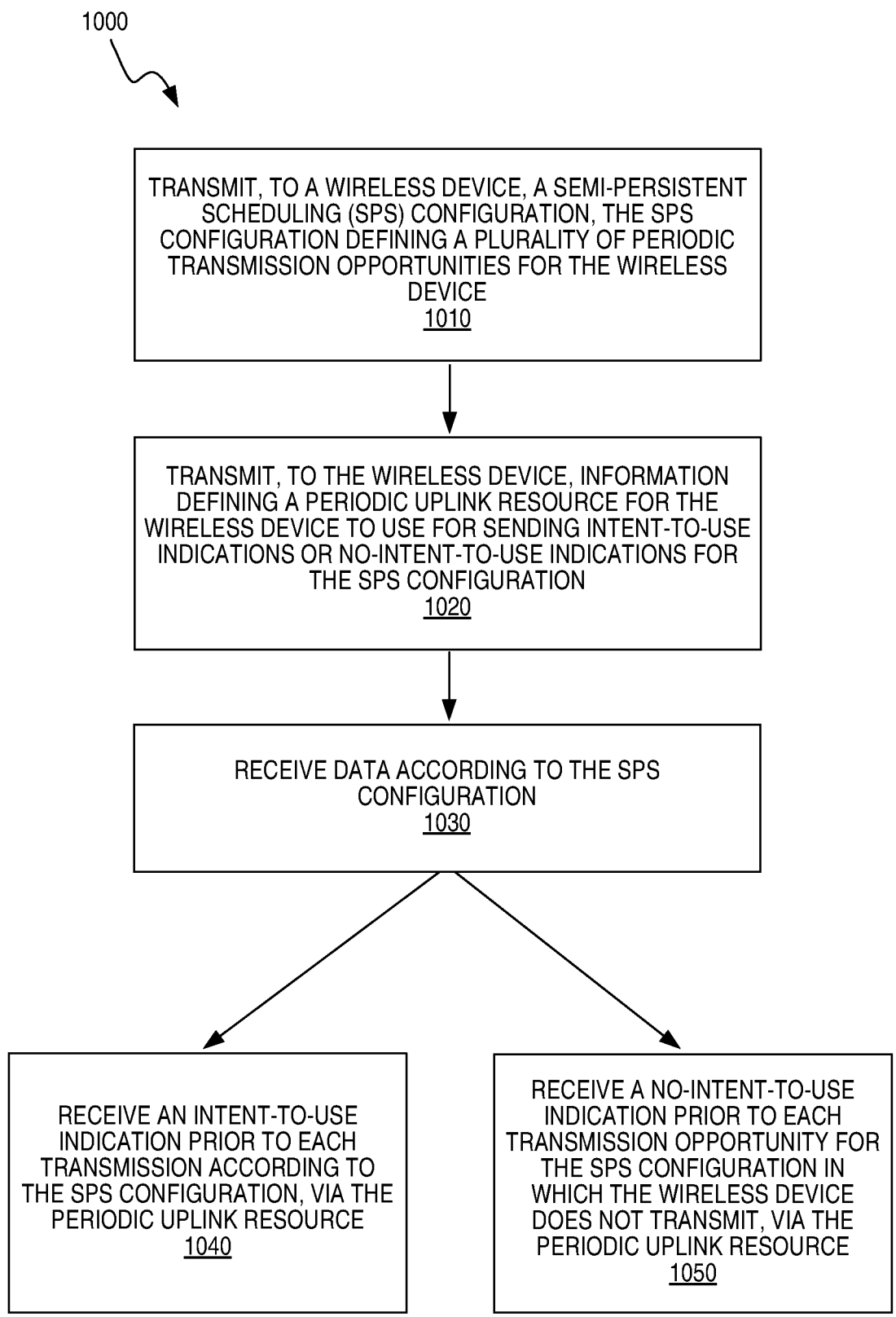
FIG. 10 is a process flow diagram illustrating another method carried out in the wireless network node, according to some embodiments.

Several of the techniques and methods described above may be implemented using electronic data processing circuitry and radio transceiver or other interface circuitry provided in a wireless network node, such as in an eNB or other base station. FIG. 8 illustrates an example configuration of a base station 800 that, in some embodiments, may perform some or all of the base-station related methods described herein.

Base station 800, which may be an eNB for use in an LTE RAN, for example, includes a communication interface circuit configured to communicate with a core network (CN) node and configured to communicate with one or more wireless devices. In this case, the communication interface circuit includes two parts—radio transceiver circuitry 810 and a network interface circuit 840. The radio transceiver circuitry 810 is configured to receive and/or transmit communication measurements, data, instructions, and/or messages to and from one or more wireless devices. The network interface circuit 840 is configured to receive and send network communications to and from other network nodes, including one or more CN nodes. It should be appreciated that the radio circuitry 810 may include any number of transceiving, receiving, and/or transmitting units or circuitry. The radio circuitry 810 and/or network interface 840 may comprise radio-frequency (RF) circuitry and baseband processing circuitry, the details of which are well known to those familiar with base station design.

The base station 800 also includes processing circuitry 820, which is configured to, using suitable program code stored in program storage memory 830, for example, transmit, to a wireless device two or more SPS configurations. Each of the SPS configurations define a plurality of periodic transmission opportunities for the wireless device, at least two of the two or more SPS configurations having different periods for the periodic transmission opportunities. The processing circuitry 820 is also configured to receive data corresponding to a first traffic type or a first radio bearer according to a first one of the two or more SPS configurations and receiving data corresponding to a second traffic type or a second radio bearer according to a second one of the two or more SPS configurations.

The processing circuitry 820 is also configured to transmit, to a wireless device, an SPS configuration. The SPS configuration defines a plurality of periodic transmission opportunities for the wireless device. The processing circuitry 820 is configured to also transmit, to the wireless device, information defining a periodic uplink resource for the wireless device to use for sending intent-to-use indications or no-intent-to-use indications for the SPS configuration and receiving data according to the SPS configuration. The processing circuitry 820 is also configured to receive an intent-to-use indication prior to each transmission according to the SPS configuration, via the periodic uplink resource, or receive a no-intent-to-use indication prior to each transmission opportunity for the SPS configuration in which the wireless device does not transmit, via the periodic uplink resource.

The processing circuitry 820, as for processing circuit 510, may be any suitable type of computation unit, e.g. a microprocessor, digital signal processor (DSP), field programmable gate array (FPGA), or application specific integrated circuit (ASIC), or any other form of circuitry. The base station 800 may further comprise a memory unit or circuitry 830 which may be any suitable type of computer readable memory and may be of volatile and/or non-volatile type. The memory 830 may be configured to store program data, for use by processing circuitry 820, as well as configuration data, operational data, etc.

The base station 800, according to some embodiments, is also configured to perform methods 900 and 1000. The method 900 includes transmitting, to a wireless device, two or more SPS configurations (block 910). Each of the SPS configurations define a plurality of periodic transmission opportunities for the wireless device, at least two of the two or more SPS configurations having different periods for the periodic transmission opportunities. The method 900 also includes receiving data corresponding to a first traffic type or a first radio bearer according to a first one of the two or more SPS configurations and receiving data corresponding to a second traffic type or a second radio bearer according to a second one of the two or more SPS configurations (block 920).

The method 900 may also include transmitting, to the wireless device, information defining, for each of the two or more SPS configurations, a periodic uplink resource for the wireless device to use for sending intent-to-use indications or no-intent-to-use indications for the corresponding SPS configuration. The information defining the periodic uplink resource for each of the two or more SPS configurations may be transmitted with the two or more SPS configurations.

In some cases, the method 900 further includes receiving an intent-to-use indication prior to each transmission according to the first one of the two or more SPS configurations, via the periodic uplink resource corresponding to the first one of the two or more SPS configurations. The intent-to-use indication may be received in a first transmission-time interval, which immediately precedes a second transmission-time interval carrying the transmission according to the first one of the two or more SPS configurations.

In other cases, the method 900 includes receiving a no-intent-to-use indication prior to each transmission opportunity for the first one of the two or more SPS configurations in which the wireless device does not transmit, via the periodic uplink resource corresponding to the first one of the two or more SPS configurations. The no-intent-to-use indication may be received in a first transmission-time interval, which immediately precedes a second transmission-time interval containing the transmission opportunity according to the first one of the two or more SPS configurations.

The method 1000 includes transmitting, to a wireless device, an SPS configuration (block 1010). The SPS configuration defines a plurality of periodic transmission opportunities for the wireless device. The method 1000 also includes transmitting, to the wireless device, information defining a periodic uplink resource for the wireless device to use for sending intent-to-use indications or no-intent-to-use indications for the SPS configuration (block 1020) and receiving data according to the SPS configuration (block 1030). The method 1000 further includes receiving an intent-to-use indication prior to each transmission according to the SPS configuration, via the periodic uplink resource (block 1040), or receiving a no-intent-to-use indication prior to each transmission opportunity for the SPS configuration in which the wireless device does not transmit, via the periodic uplink resource (block 1050). The information defining the periodic uplink resource for the SPS configuration may be transmitted with the SPS configuration.

Of course, it will be appreciated that not all of the steps of these techniques are necessarily performed in a single microprocessor or even in a single module. It will be appreciated that the processing circuits 510, as adapted with program code stored in program and data memory 555 and 560, can implement any one or more of the wireless-device-related methods described above using an arrangement of functional "modules," where the modules are computer programs or portions of computer programs executing on the processor circuit 510. Thus, the apparatus 500 can be understood as comprising a radio transceiver circuit 520 configured to communicate with a wireless network and further comprising several functional modules implemented in processing circuitry 510, where each of the functional modules corresponds to one or several of the method steps described in any one or several of the wireless-device-related methods described above.

Figure 11:
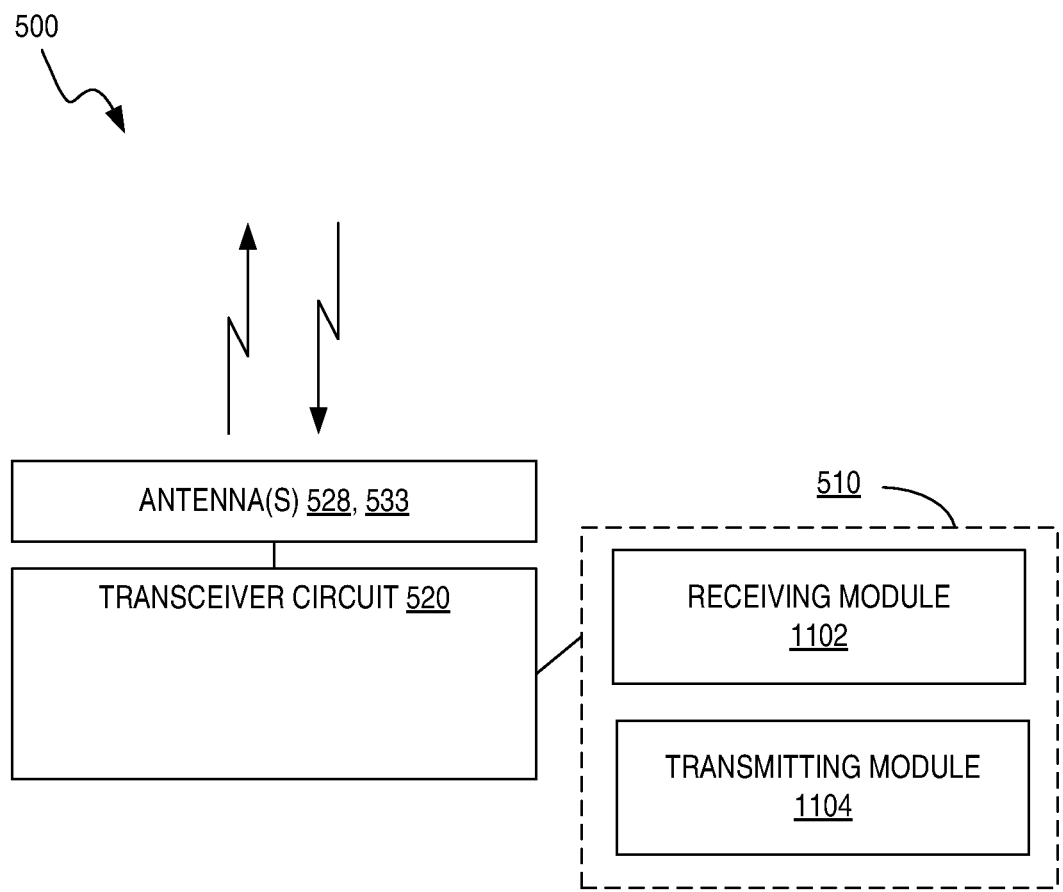
FIG. 11 is an example functional implementation of a wireless device, according to some embodiments.

For example, FIG. 11 illustrates an example functional module or circuit architecture as may be implemented in the wireless device 500, e.g., based on the processing circuitry 510. The illustrated embodiment at least functionally includes a receiving module 1102 for receiving, from a wireless network node, two or more SPS configurations, each of the SPS configurations defining a plurality of periodic transmission opportunities for the wireless device, at least two of the two or more SPS configurations having different periods for the periodic transmission opportunities. The implementation also includes a transmitting module 1104 for transmitting data corresponding to a first traffic type or a first radio bearer according to a first one of the two or more SPS configurations and transmitting data corresponding to a second traffic type or a second radio bearer according to a second one of the two or more SPS configurations.

Figure 12:
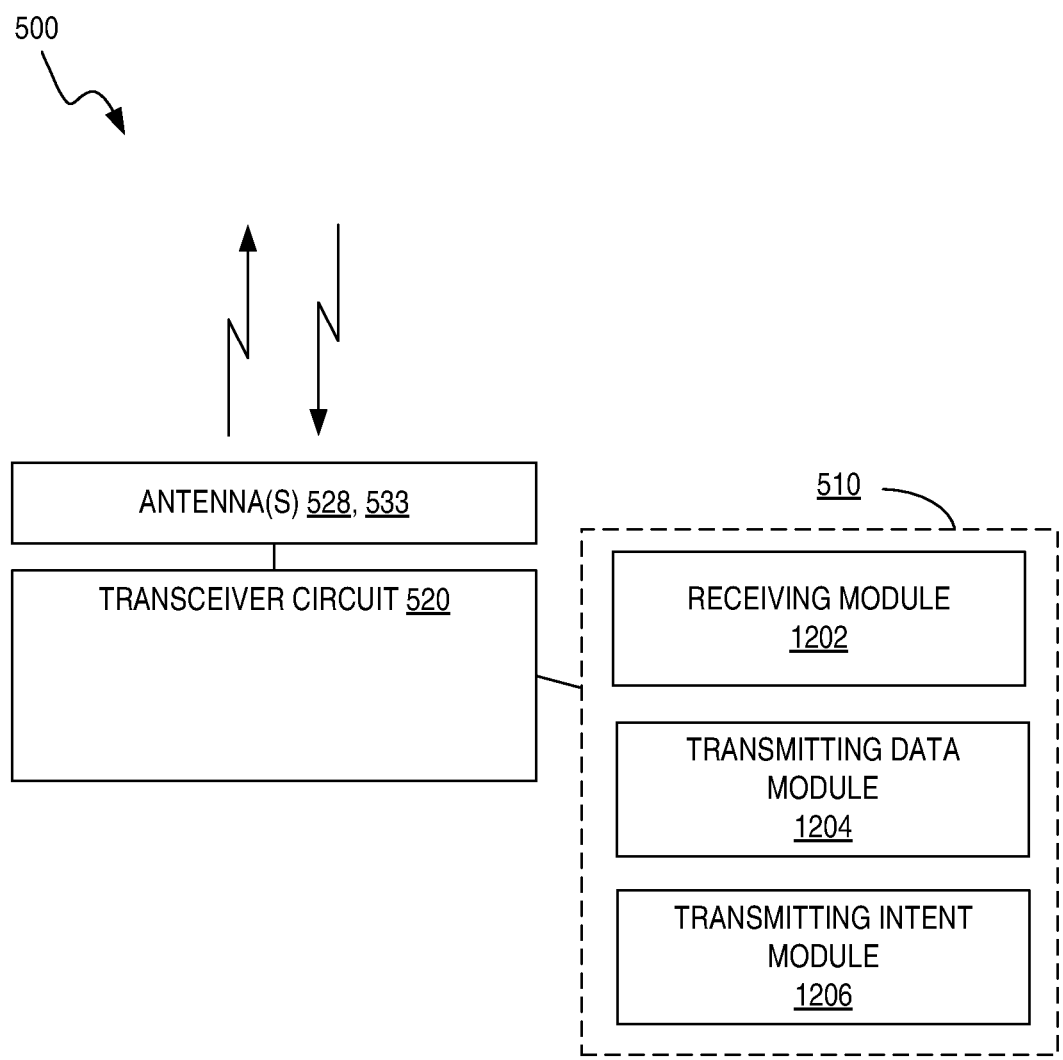
FIG. 12 is another example functional implementation of a wireless device, according to some embodiments.

FIG. 12 illustrates another example functional module or circuit architecture as may be implemented in the wireless device 500, e.g., based on the processing circuitry 510. The illustrated embodiment at least functionally includes a receiving module 1202 for receiving, from a wireless network node, an SPS configuration, the SPS configuration defining a plurality of periodic transmission opportunities for the wireless device. The receiving module 1202 is also for receiving, from the wireless network node, information defining a periodic uplink resource for sending intent-to-use indications or no-intent-to-use indications for the SPS configuration. The implementation also includes a transmitting data module 1204 for transmitting data according to the SPS configuration and a transmitting intent module 1206 for transmitting an intent-to-use indication prior to each transmission according to the SPS configuration, using the periodic uplink resource, or transmitting a no-intent-to-use indication prior to each transmission opportunity for the SPS configuration in which the wireless device does not transmit, using the periodic uplink resource.

It will be appreciated that the processing circuitry 820, as adapted with program code stored in program and data memory 830, can implement any one or more of the base-station-related methods described above using an arrangement of functional "modules," where the modules are computer programs or portions of computer programs executing on the processor circuitry 820. Thus, the base station 800 can be understood as comprising radio transceiver circuitry 810 configured to communicate with one or more wireless devices, and further comprising several functional modules implemented in processing circuitry 820, where each of the functional modules corresponds to one or several of the method steps described in any one or several of the base station-related methods described above.

Figure 13:
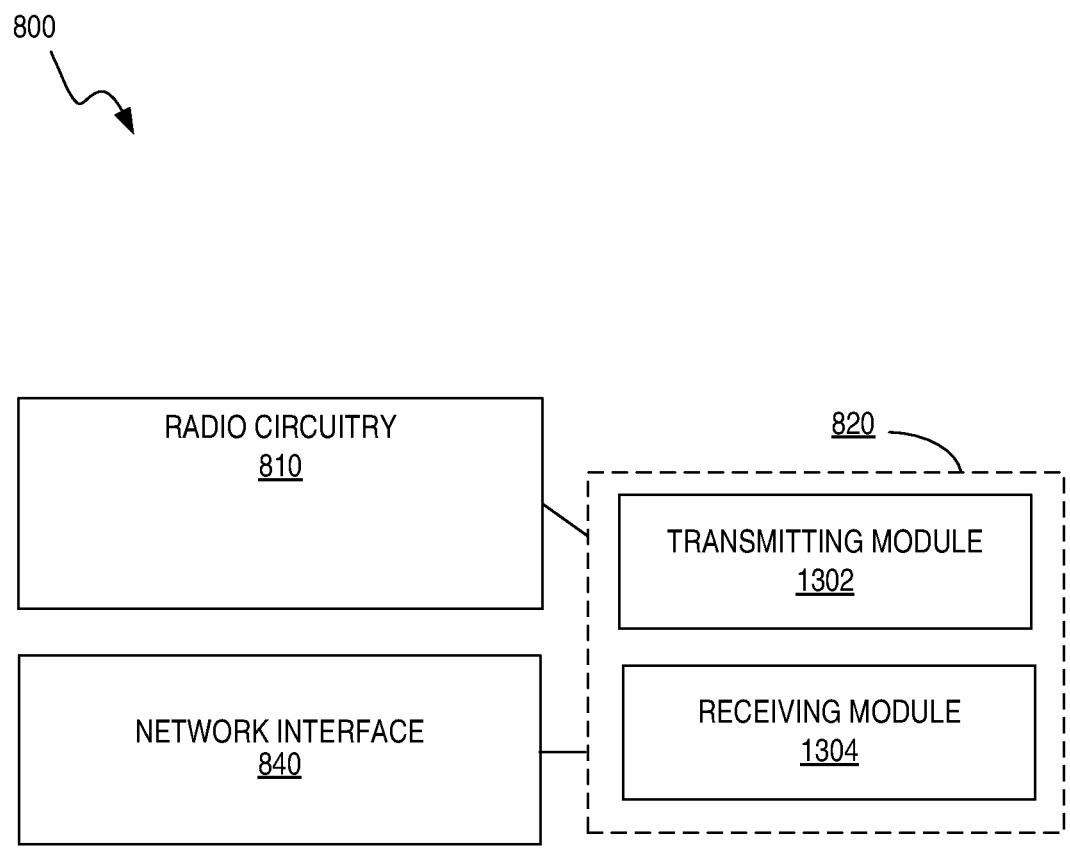
FIG. 13 is an example functional implementation of a base station, according to some embodiments.

For example, FIG. 13 illustrates an example functional module or circuit architecture as may be implemented in the base station 800, e.g., based on the processing circuitry 820. The illustrated embodiment at least functionally includes a transmitting module 1302 for transmitting, to a wireless device, two or more SPS configurations, each of the SPS configurations defining a plurality of periodic transmission opportunities for the wireless device, at least two of the two or more SPS configurations having different periods for the periodic transmission opportunities. The implementation also includes a receiving module 1304 for receiving data corresponding to a first traffic type or a first radio bearer according to a first one of the two or more SPS configurations and receiving data corresponding to a second traffic type or a second radio bearer according to a second one of the two or more SPS configurations.

Figure 14:
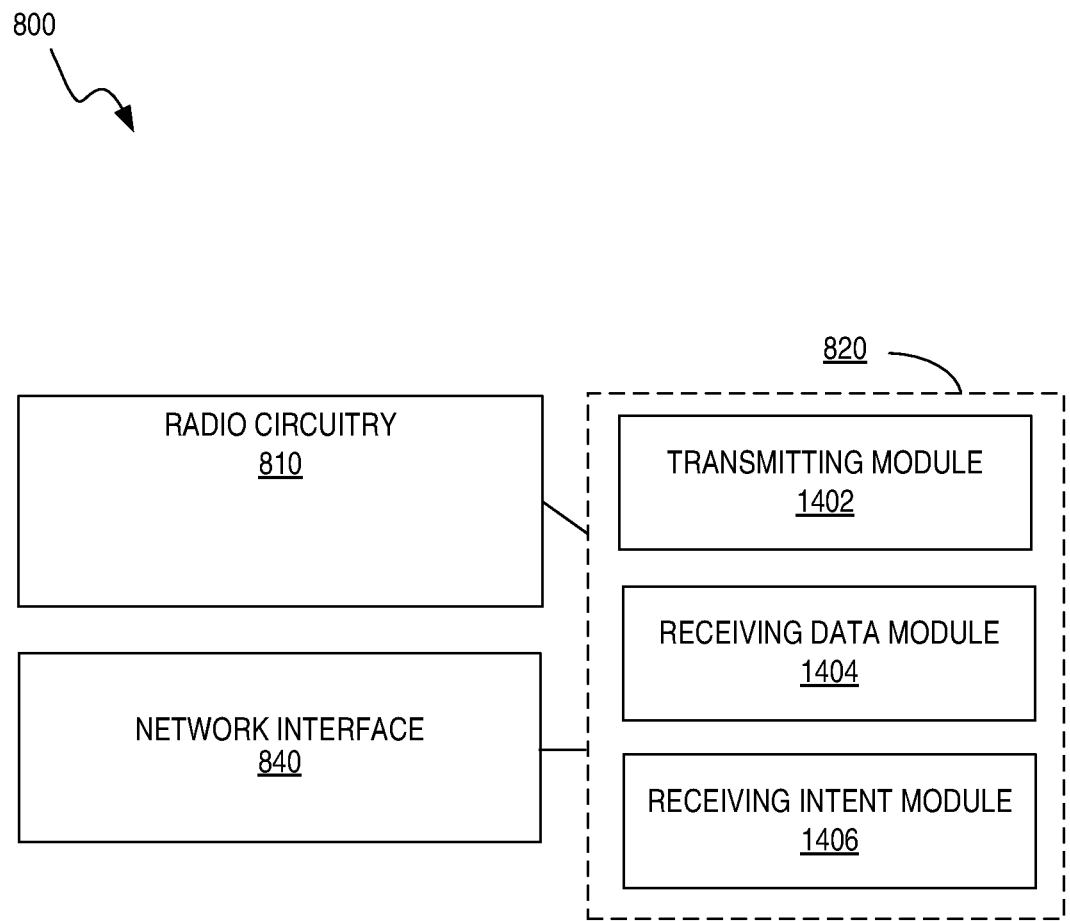
FIG. 14 is another example functional implementation of a base station, according to some embodiments.

FIG. 14 illustrates another example functional module or circuit architecture as may be implemented in the wireless network node 800, e.g., based on the processing circuitry 820. The illustrated embodiment at least functionally includes a transmitting module 1402 for transmitting, to a wireless device, an SPS configuration, the SPS configuration defining a plurality of periodic transmission opportunities for the wireless device. The transmitting module 1402 is also for transmitting, to the wireless device, information defining a periodic uplink resource for the wireless device to use for sending intent-to-use indications or no-intent-to-use indications for the SPS configuration. The implementation also includes a receiving data module 1404 for receiving data according to the SPS configuration and a receiving intent module 1406 for receiving an intent-to-use indication prior to each transmission according to the SPS configuration, via the periodic uplink resource, or receiving a no-intent-to-use indication prior to each transmission opportunity for the SPS configuration in which the wireless device does not transmit, via the periodic uplink resource.

It will be appreciated by the person of skill in the art that various modifications may be made to the above-described embodiments without departing from the scope of the present invention. For example, although embodiments of the present invention have been described with examples that reference a communication system compliant to the 3GPP-specified LTE standards, it should be noted that the solutions presented may be equally well applicable to other networks.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

Additional Observations and Embodiments

Some of the techniques discussed above may be involved in solving latency reduction issues in the V2X domain. It is observed that, in some scenarios, Uu and PC5 can fulfill end-to-end latency requirements of 100 ms, at least with certain parameter setting and operating conditions (e.g., UEs in connected mode). On the other hand, in some other scenarios, it is harder to achieve such latency requirements. It has also been observed that it would be beneficial to make improvements to both Uu and PC5, in order to meet V2X end-to-end latency requirements. As the delay due to establishing an RRC connection (max. 50 ms without considering paging delay) might be too high to fulfill the requirements, it may be reasonable to assume that, as a baseline, V2X-capable UEs are always in RRC connected mode. On-board devices mounted in cars seem to not have any significant battery constraint, and the burden on the eNB to store the RRC context for each UE seems to be a hardware limitation that can be solved by implementation.

However, there might be cases in which, for different reasons, a certain UE needs to be released. In such cases, quick RRC context retrieval should be enabled, for example, using the principles of RRC functions for suspend-resume. Therefore, some solutions may involve assuming that baseline UEs in V2V are in RRC CONNECTED mode and/or using RRC functions for suspend-resume when the RRC connection is suspended. Other possible latency reduction enhancements in V2X may apply to a scheduler (e.g. SPS, contention based PUSCH (CB-PUSCH)), SR transmission, handover, or road-side unit (RSU) operations.

Some embodiments involve scheduler enhancements where V2X traffic is expected to be a periodic-type of traffic. As discussed earlier, the packet generation interval for CAM messages may depend on the V2X application and can vary from 100 ms to 1 s. The triggering for packet generation is influenced by external conditions, e.g., vehicle geographical position, speed, direction, etc. Event-triggered messages (DENM) can be somehow considered periodic since once triggered they are repeated 6 times every 100 ms. Regarding the message size, there is a dependence on the type of security component that is used (i.e. full certificate or certificate digest) and the message type (CAM or DENM). The type of security overhead may be time-dependent (140-200 bytes and 80 bytes every 500 ms and 100 ms, respectively), and the DENM payload might be significantly larger than CAM (800 bytes as total DENM size and 190/300 bytes as total CAM size).

Also, latency requirements might differ significantly depending on the specific use case, i.e., 20 ms for pre-crash warning, 100 ms for a typical V2V/I application, 500 ms for V2X road safety services via infrastructure, and is for V2N.

In another observation, V2X services imply a large variety of traffic types each with different periodicity, size, and latency requirements. Such variety makes V2X more complex than other types of periodic traffic, e.g., VoIP. In order to properly handle V2X services, separate dedicated bearers corresponding to different traffic characteristics (e.g., periodicity, message type, priority) should be allocated. To alleviate the latency of establishing new dedicated bearers, pre-established bearers may be used for both multicast and unicast transmissions.

Accordingly, in some embodiments, dedicated bearers may be pre-established for both multicast and unicast transmissions. Another difference compared with VoIP traffic is that, in Voice over LTE (VoLTE), the eNB can use SID (silent insertion descriptor) packets that are sent when the user is in silence to adapt the scheduler. For example, the eNB can release SPS upon detecting SID. In V2X, the eNB does not have this type of information, and the periodic traffic can be suddenly terminated depending on the external conditions discussed earlier. For this reason, there is the risk that the eNB keeps scheduling the UE unnecessarily or does not release timely SPS, thus resulting in resource wastage. Therefore, the UE may indicate (e.g., at L2) when a certain V2X traffic type is terminated at the application client. For example, the UE could send this indication as part of a last CAM/DENM message.

In some embodiments, the UE informs the eNB when a certain V2X traffic type is terminated at the application client. One similar problem arises when the UE needs to transmit the security component as part of a CAM session. Since, as previously described, the message containing the security component is quite larger than other messages, the scheduler would need to be informed in order to change scheduling allocation, thereby limiting packet segmentation and hence latency. To tackle this issue, the UE could inform the eNB that the next packet will contain a security component. In some cases, the UE informs the eNB that next packet will contain a security component.

Higher layer headers may hardly be of a predictable size and periodicity can contribute to the traffic. Another difference between CAM traffic and, for example, VoIP or other mobile broadband (MBB) traffic is that CAM packets typically override/supersede each other. Once a new packet is generated, the previous ones become redundant and segmentation of CAM packets becomes therefore of limited use. Furthermore, the UE might need to be engaged in multiple V2X services, e.g., V2N for traffic flow optimization, V2I or V2V for more local road safety services, each with possible different periodicity and packet sizes. SPS is efficient when packets are generated periodically with fixed frequency. Segmentation handles packet size dynamics at the cost of increased jitter. As explained earlier, current SPS is not suitable for V2X traffic due to the higher dynamicity and irregularity of packets arrivals. However, periodic resource reservation can still be advantageously exploited to accommodate V2X traffic. Various techniques discussed herein involve enhancements to the SPS protocol that will improve network efficiency in case of V2X traffic.

In order to cope with irregular traffic, some embodiments include the UE acknowledging individual transmissions that are scheduled in a semi-persistent way. The acknowledgment may be carried on PUCCH prior to the actual transmission. The eNB has the chance to reuse unacknowledged resources for other purposes. FIG. 2, discussed earlier, provides an example solution, which may involve enhanced SPS for CAM traffic. A similar protocol may also be applied for acknowledging transmissions for mode-1 PC5. In some cases, the UE needs to acknowledge each transmission scheduled by the eNB with SPS. The eNB may reuse unacknowledged SPS resources for other purposes.

Individual CAM packets may largely vary in size, e.g., from 190 bytes to 300 bytes (or larger). The MAC PDU size is hardly predictable and segmentation is not a preferred solution due to strict latency constraints. In other words, the SPS transport block (TB) size, and possibly the resource allocation size, needs to be dynamically adapted to the size of each UL transmission. To this purpose, in some embodiments, multiple parallel SPS processes activated at the UE may be configured. The processes may differ, for example, in the TB size or in the resource allocation. The UE may trigger individual transmissions on each SPS process (or select the preferred process) depending on its buffer status. In some cases, the network should be able to configure parallel SPS processes with different configuration parameters. The UE may acknowledge transmissions on each process depending on its buffer status.

With respect to urgent CAM messages, some techniques discussed herein may be beneficial for any type of V2X scheduler, including SPS, which may be a good scheduler candidate given the periodic nature of V2X traffic. However, it is observed that usage of low SPS periodicity values (e.g., 1 ms) might be constrained by the actual network load. Another improvement related to SPS may include sending acknowledgements to SPS activation/deactivation commands sent on PDCCH. This would help the eNB in being timely aligned with the UE in terms of SPS activation/deactivation state. Benefits include a better resource utilization (e.g., in the case where the SPS activation command has not been received by the UE) and reduced UL interference (e.g., in the case where the deactivation command has not been received by the UE), as well as limited batter consumption (which might be desirable in V2P). However, given the expected resource shortage in V2X, there might be also drawbacks since additional transmissions have to be considered for the SPS activation/deactivation acknowledgments and related HARQ feedbacks. It is observed that enabling acknowledgements to SPS activation/deactivation commands might be useful in V2X depending on the actual resource utilization.

In CB-PUSCH, more than one UE is allowed to use the same PUSCH resource with the possibility of UEs skipping the UL transmission, in case of an empty buffer. Benefits include an increased resource utilization that comes at the expense of collision risks, which, in turn, could increase correct packet delivery, i.e., latency. In cases of low load, CB-PUSCH may be used with low periodicity SPS. However, in typical high loaded V2X scenarios, this technique might not be good, especially for road safety messages. Therefore, it observed that CB-PUSCH can be useful in V2X depending on the actual network load.

To reduce the latency of SR transmissions, it is possible to configure SR periodicity to the minimum value of 1 ms. However, configuring all UEs to 1 ms periodicity might imply too high of a resource consumption. To limit this, in some cases, to reduce SR transmission delay while limiting SR resource usage, the UE may be configured to transmit SR on both primary cell (PCell) and one secondary cell (SCell) as part of carrier aggregation. This feature also makes it possible to use different SR resources for different purposes, e.g., different SR resources for CAM and DENM, so that the eNB can provide a more suitable UL grant to the UE. Therefore, in some cases, SR resources may be configured both on PCell and SCell to reduce SR transmission latency. Different SR resources may be used depending on the type of V2X message to be transmitted afterwards.

With respect to handover, various techniques discussed herein may be applicable to Uu for V2X, while more ad-hoc solutions may be used for PC5 for V2X. The random access channel (RACH) procedure in a target cell might take up to 10-12 ms. To eliminate this delay, a RACH-less handover may be used as long as the target and the source cell are synchronized, and as long as it relies on the capability of the UE to acquire UL synchronization from the DL propagation delay difference between source and target.

Although the mechanism can provide benefits in V2X, the assumption of synchronized networks is somewhat restricting and the accuracy of UL time advance acquisition might be impaired by mobility. Given the fact that there is no contention resolution, a wrong time advance acquisition could imply higher latency than legacy RACH and spurious transmissions could cause interference. Therefore, it is observed that the effectiveness of a RACH-less handover in V2X might be subject to UE mobility.

After reception of a handover command, a UE may not reset MAC/packet data convergence protocol (PDCP) processes (as it happens in legacy LTE) and the UE may keep normal operations towards the source cell until RACH is successful in the target cell. Since, in legacy LTE, the overall service interruption at handover is between 40-50 ms (due to handover command processing and random access procedure), such a mechanism would basically eliminate at all this latency component. This solution resembles dual-connectivity, even though dual connectivity as such does not support intra-frequency operations today. In some cases, the handover procedure may be enforced by sending/receiving handover-related signaling (e.g., measurement reports, handover commands) to/from both source and target cell, thus reducing radio link failure (RLF) probability. Therefore, given the positive impact on handover latency, various techniques discussed herein may be beneficial for V2X. In some cases, the source eNB connection may be maintained during handover. In other cases, handover-related RRC messages may be provided to/from both source and target cells.

Similar to Uu, UEs engaged in PC5 communications are also subject to latency when performing the handover. Looking at ProSe, a UE, before continuing an ongoing PC5 session after a handover command, needs to wait for the target cell sending a D2D grant on PDCCH or dedicated signaling (if in connected mode) indicating mode 1 and mode 2 resource allocation, respectively. Similarly, in idle mode, an SIB18 from a target cell has to be acquired and related latency depends on corresponding si-Periodicity. To reduce this PC5 service interruption issue, some alternatives are possible.

In some cases, the UE may use pre-configured handover resources after a handover command and until PC5 resources are not provided by the target cell. This has the advantage of not requiring any inter-cell coordination. In other cases, the target cell and the source cell may use common resources at cell edges. Such resources are provided by the source cell for both UEs in connected and idle mode and are to be used until handover is not completed. This does not imply any increased signaling and allows UEs performing handover to use the same pool of resources, but requires inter-eNB synchronization.

In some cases, for UEs in connected mode, target cell PC5 resources may be transferred via a handover command. For UEs in idle mode, target cell PC5 resources may be transferred by source in SIB18 and used upon reception of handover command. This allows a quick resource switch at the expense of increased size of a handover command, which is, in general, not desirable. In other cases, to avoid connection interruption during handover, UEs may keep multiple PC5 connections using different resources allocated by source and target cells, which is in line with Uu-related enhancements involving maintaining a source eNB connection during handover. PC5 resources of a target cell may be signaled to the UE via the handover command. PC5 resources of a source cell may be maintained during handover.

Latency can also be impacted by network deployment. For instance, in a combined cell deployment (also known as shared cell or distributed antenna system), the cells are combined into a single physical cell. Therefore, a UE moving within the combined cell detects a single cell, i.e., a single physical cell identity (PCI), rather than two or more cells and the UE does not perform any handover. For this reason, the combined cell feature itself does not reduce the latency, but it reduces the number of handovers. Therefore, it is observed that a combined cell deployment may reduce the number of handovers.

In some scenarios, a roadside unit (RSU) might be required by an application to forward some of the packets received over PC5 to Uu. It was observed that fulfilling a 100 ms latency requirement may be difficult. Besides the PC5 latency (up to 86 ms for the UE to send sidelink control information (SCI) and data to the RSU over the PC5), which can be reduced by considering shorter communication periods, the scheduling request mechanism over Uu brings a non-negligible latency contribution (mean delay 24.3 ms). This mechanism involves sending, over Uu, an SR message from the RSU to the eNB, a return UL grant, a sidelink buffer status report (SL BSR) from the RSU to the eNB, a return UL grant, and then data from the RSU to the eNB.

One way to reduce this latency includes the UE estimating the size of PC5 incoming data from SCI format 0 (which contains MCS and PRB allocation) and sending a scheduling request (SR) blindly before receiving the actual PC5 data. Since the eNB does not know when the data to be transmitted over Uu will be actually available at the RSU, it should be allowed to skip the grant provided by the eNB until such data is not available. For example, the RSU may send an SR to the eNB over Uu right after the UE provides the SCI to the RSU over PC5. The return UL grant, the SL BSR transmission and additional return UL grant may take place before the data is transmitted from the UE to the RSU over PC5 and then subsequently transmitted from the RSU to the eNB over Uu. That is, the eNB may configure the RSU to request Uu resources upon reading SCI format 0 over PC5.

A summary of techniques for reducing latency in V2X includes the following. For an eNB scheduler: dedicated bearers may be pre-established for multicast and unicast; multiple SPS configurations may be supported per UE; and the UE may be configured to assist the eNB in a scheduling decision of periodic traffic. For example, the UE may inform the eNB when a certain V2X traffic type is terminated at the application client and that a next packet will contain a security component.

For SR transmission: SR resources may be configured both on PCell and SCell to reduce SR transmission latency; and different SR resources may be used depending on the type of V2X message to be transmitted afterwards.

For Handover: deployment may be optimized to reduce handover frequency and reduce risk of RLF (e.g., combined cell deployment); a source eNB connection may be maintained during handover in V2X; handover-related RRC messages may be provided to/from both source and target cells; PC5 resources of target cell may be signaled to the UE via the handover command; and a PC5 resource of a source cell may be maintained during handover.

For RSU operations, the eNB may configure the RSU to request Uu resources upon reading SCI format 0 over PC5. Embodiments of the presently disclosed invention include, but are not limited to, the following enumerated examples:

a.) A method, in a wireless device the method comprising:
  receiving, from a wireless network node, a semi-persistent scheduling, SPS, configuration, the SPS configuration defining a plurality of periodic transmission opportunities for the wireless device (500);
  receiving, from the wireless network node, information defining a periodic uplink resource for sending intent-to-use indications or no-intent-to-use indications for the SPS configuration; and
  transmitting data according to the SPS configuration;
wherein the method further comprises at least one of:
  transmitting an intent-to-use indication prior to each transmission according to the SPS configuration, using the periodic uplink resource; and
  transmitting a no-intent-to-use indication prior to each transmission opportunity for the SPS configuration in which the wireless device does not transmit, using the periodic uplink resource.

b.) The method of example a, wherein the information defining the periodic uplink resource for the SPS configuration is received with the SPS configuration.

c.) The method of examples a or b, wherein the transmitting of data is performed as uplink transmissions to the wireless network node.

d.) The method of examples a or b, wherein the transmitting of data is performed as sidelink transmissions to a second wireless device.

e.) A method, in a wireless network node, the method comprising:
  transmitting, to a wireless device, a semi-persistent scheduling, SPS, configuration, the SPS configuration defining a plurality of periodic transmission opportunities for the wireless device;
  transmitting, to the wireless device, information defining a periodic uplink resource for the wireless device to use for sending intent-to-use indications or no-intent-to-use indications for the SPS configuration; and
  receiving data according to the SPS configuration;
wherein the method further comprises at least one of:
  receiving an intent-to-use indication prior to each transmission according to the SPS configuration, via the periodic uplink resource; and
  receiving a no-intent-to-use indication prior to each transmission opportunity for the SPS configuration in which the wireless device does not transmit, via the periodic uplink resource.

f.) The method of example e, wherein the information defining the periodic uplink resource for the SPS configuration is transmitted with the SPS configuration.

g.) A wireless device, the wireless device being adapted to:
  receive, from a wireless network node, a semi-persistent scheduling, SPS, configuration, the SPS configuration defining a plurality of periodic transmission opportunities for the wireless device;
  receive, from the wireless network node, information defining a periodic uplink resource for sending intent-to-use indications or no-intent-to-use indications for the SPS configuration; and
  transmit data according to the SPS configuration;
wherein the wireless device is further adapted to perform at least one of:
  transmitting an intent-to-use indication prior to each transmission according to the SPS configuration, using the periodic uplink resource; and
  transmitting a no-intent-to-use indication prior to each transmission opportunity for the SPS configuration in which the wireless device does not transmit, using the periodic uplink resource.

h.) The wireless device of example g, wherein the information defining the periodic uplink resource for the SPS configuration is received with the SPS configuration.

i.) The wireless device of examples g or h, wherein the wireless device is adapted to transmit the data as uplink transmissions to the wireless network node.

j.) The wireless device of examples g or h, wherein the wireless device is adapted to transmit the data as sidelink transmissions to a second wireless device.

k.) A wireless network node, the wireless network node being adapted to:
  transmit, to a wireless device, a semi-persistent scheduling, SPS, configuration, the SPS configuration defining a plurality of periodic transmission opportunities for the wireless device;
  transmit, to the wireless device, information defining a periodic uplink resource for the wireless device to use for sending intent-to-use indications or no-intent-to-use indications for the SPS configuration; and
  receive data according to the SPS configuration;
wherein the wireless network node is further adapted to perform at least one of:
  receiving an intent-to-use indication prior to each transmission according to the SPS configuration, via the periodic uplink resource; and
  receiving a no-intent-to-use indication prior to each transmission opportunity for the SPS configuration in which the wireless device does not transmit, via the periodic uplink resource.

l.) The wireless network node of example k, wherein the information defining the periodic uplink resource for the SPS configuration is transmitted with the SPS configuration.

m.) A wireless device comprising a radio transceiver and a processing circuit, wherein the processing circuit is configured to control the radio transceiver to:
  receive, from a wireless network node, a semi-persistent scheduling, SPS, configuration, the SPS configuration defining a plurality of periodic transmission opportunities for the wireless device;
  receive, from the wireless network node, information defining a periodic uplink resource for sending intent-to-use indications or no-intent-to-use indications for the SPS configuration; and
  transmit data according to the SPS configuration;
wherein the processing circuit is further configured to control the radio transceiver to perform at least one of:
  transmitting an intent-to-use indication prior to each transmission according to the SPS configuration, using the periodic uplink resource; and
  transmitting a no-intent-to-use indication prior to each transmission opportunity for the SPS configuration in which the wireless device does not transmit, using the periodic uplink resource.

n.) The wireless device of example m, wherein the information defining the periodic uplink resource for the SPS configuration is received with the SPS configuration.

o.) The wireless device of examples m or n, wherein the processing circuit is configured to transmit the data as uplink transmissions to the wireless network node.

p.) The wireless device of examples m or n, wherein the wherein the processing circuit is configured to transmit the data as sidelink transmissions to a second wireless device.

q.) A wireless network node comprising a radio transceiver and a processing circuit, wherein the processing circuit is configured to control the radio transceiver to:
  transmit, to a wireless device, a semi-persistent scheduling, SPS, configuration, the SPS configuration defining a plurality of periodic transmission opportunities for the wireless device;
  transmit, to the wireless device, information defining a periodic uplink resource for the wireless device to use for sending intent-to-use indications or no-intent-to-use indications for the SPS configuration; and
  receive data according to the SPS configuration;
wherein the processing circuit is further configured to perform at least one of:
  receiving an intent-to-use indication prior to each transmission according to the SPS configuration, via the periodic uplink resource; and
  receiving a no-intent-to-use indication prior to each transmission opportunity for the SPS configuration in which the wireless device does not transmit, via the periodic uplink resource.

r.) The wireless network node of example q, wherein the information defining the periodic uplink resource for the SPS configuration is transmitted with the SPS configuration.

s.) A computer program product comprising program instructions that, when executed by a processor in a wireless device, causes the wireless device to carry out a method according to any of examples a-d.

t.) A computer program product comprising program instructions that, when executed by a processor in a wireless network node, causes the wireless network node to carry out a method according to any of examples e-f.

u.) A computer-readable medium comprising the computer program product of example s or t.

v.) A wireless device, comprising:
  a receiving module for receiving, from a wireless network node, a semi-persistent scheduling, SPS, configuration, the SPS configuration defining a plurality of periodic transmission opportunities for the wireless device;
  the receiving module for receiving, from the wireless network node, information defining a periodic uplink resource for sending intent-to-use indications or no-intent-to-use indications for the SPS configuration;
  a transmitting data module for transmitting data according to the SPS configuration; and
  a transmitting intent module for performing at least one of:
    transmitting an intent-to-use indication prior to each transmission according to the SPS configuration, using the periodic uplink resource; and
    transmitting a no-intent-to-use indication prior to each transmission opportunity for the SPS configuration in which the wireless device does not transmit, using the periodic uplink resource.

w.) A wireless network node, comprising:
  a transmitting module for transmitting, to a wireless device, a semi-persistent scheduling, SPS, configuration, the SPS configuration defining a plurality of periodic transmission opportunities for the wireless device;
  the transmitting module for transmitting, to the wireless device, information defining a periodic uplink resource for the wireless device to use for sending intent-to-use indications or no-intent-to-use indications for the SPS configuration;
  a receiving data module for receiving data according to the SPS configuration; and
  a receiving intent module for performing at least one of:
    receiving an intent-to-use indication prior to each transmission according to the SPS configuration, via the periodic uplink resource; and
    receiving a no-intent-to-use indication prior to each transmission opportunity for the SPS configuration in which the wireless device does not transmit, via the periodic uplink resource.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device, the method comprising:
  receiving, from a wireless network node, a first and a second semi-persistent scheduling (SPS) configuration, each of the first and the second SPS configurations defining a plurality of periodic transmission opportunities for the wireless device and the first SPS configuration being associated to a first V2x traffic type and the second SPS configuration being associated to a second specific V2x traffic type, the first and the second SPS configurations having different periods for the periodic transmission opportunities;
  receiving, from the wireless network node, information defining, for each of the first and second SPS configurations, a periodic uplink resource for sending intent-to-use indications or no-intent-to-use indications for the corresponding SPS configuration;

transmitting, to the wireless network node, an acknowledgement to use the first and/or the second SPS configuration; and transmitting data corresponding to the first V2x traffic type according to the first SPS configuration associated to the first V2x traffic type and transmitting data corresponding to a second V2x traffic type according to the second SPS configuration associated to the second V2x traffic type.

2. The method of claim 1, wherein the information defining the periodic uplink resource for each of the SPS configurations is received with the two SPS configurations.

3. The method of claim 1, wherein the method comprises transmitting an intent-to-use indication prior to each transmission according to the first SPS configuration, using the periodic uplink resource corresponding to the first SPS configuration.

4. The method of claim 3, wherein the intent-to-use indication is sent in a first transmission-time interval, which immediately precedes a second transmission-time interval carrying the transmission according to the first SPS configuration.

5. The method of claim 1, wherein the method comprises transmitting a no-intent-to-use indication prior to each transmission opportunity for the first SPS configuration in which the wireless device does not transmit, using the periodic uplink resource corresponding to the first SPS configuration.

6. The method of claim 5, wherein the no-intent-to-use indication is sent in a first transmission-time interval, which immediately precedes a second transmission-time interval containing the transmission opportunity according to the first SPS configuration.

7. The method of claim 1, wherein the transmitting of data corresponding to the first traffic type according to the first SPS configuration and the transmitting of data corresponding to a second traffic type according to the second SPS configurations are performed as uplink transmissions to the wireless network node.

8. The method of claim 1, wherein the transmitting of data corresponding to the first traffic type according to the first SPS configuration and the transmitting of data corresponding to the second traffic type according to the second SPS configuration are performed as sidelink transmissions to a second wireless network node.

9. A method, in a wireless network node, comprising:
transmitting, to a wireless device, a first and a second semi-persistent scheduling (SPS) configuration, each of the first and the second SPS configurations defining a plurality of periodic transmission opportunities for the wireless device and the first SPS configuration being associated to a first V2x traffic type and the second SPS configuration being associated to a second V2x traffic type, the first and the second SPS configuration having different periods for the periodic transmission opportunities;

transmitting, to the wireless device, information defining, for each of the first and second SPS configurations, a periodic uplink resource for the wireless device to use for sending intent-to-use indications or no-intent-to-use indications for the corresponding SPS configuration;

receiving, from the wireless device, an acknowledgement to use the first and/or the second SPS configuration; and receiving data corresponding to the first V2x traffic type according to the first SPS configuration associated to the first V2x traffic type and receiving data corresponding to the second traffic type according to the second SPS configuration associated to the second V2x traffic type.

10. The method of claim 9, wherein the information defining the periodic uplink resource for each of the two SPS configurations is transmitted with the two SPS configurations.

11. The method of claim 9, wherein the method comprises receiving an intent-to-use indication prior to each transmission according to the first SPS configuration, via the periodic uplink resource corresponding to the first SPS configuration.

12. A wireless device comprising a radio transceiver and a processing circuit, wherein the processing circuit is configured to control the radio transceiver to:
receive, from a wireless network node, a first and a second semi-persistent scheduling (SPS) configuration, each of the first and the second SPS configurations defining a plurality of periodic transmission opportunities for the wireless device and the first SPS being associated to a first V2x traffic type and the second SPS configuration being associated to a second V2x traffic type, the first and the second SPS configurations having different periods for the periodic transmission opportunities;

receive, from the wireless network node, information defining, for each of the first and second SPS configurations, a periodic uplink resource for sending intent-to-use indications or no-intent-to-use indications for the corresponding SPS configuration;

transmit, to the wireless network node, an acknowledgement to use the first and/or the second SPS configuration; and transmit data corresponding to the first V2x traffic type according to the first SPS configurations associated to the first V2x traffic type and transmit data corresponding to the second V2x traffic type according to the second SPS configuration associated to the second V2x traffic type.

13. The wireless device of claim 12, wherein the information defining the periodic uplink resource for each of the two SPS configurations is received with the two SPS configurations.

14. The wireless device of claim 12, wherein the processing circuit is further configured to control the radio transceiver to transmit an intent-to-use indication prior to each transmission according to the first SPS configuration, using the periodic uplink resource corresponding to the first SPS configuration.

15. The wireless device of claim 14, wherein the processing circuit is further configured to control the radio transceiver to send the intent-to-use indication in a first transmission-time interval, which immediately precedes a second transmission-time interval carrying the transmission according to the first SPS configuration.

16. The wireless device of claim 12, wherein the processing circuit is further configured to control the radio transceiver to transmit a no-intent-to-use indication prior to each transmission opportunity for the first SPS configuration in which the wireless device does not transmit, using the periodic uplink resource corresponding to the first SPS configurations.

17. The wireless device of claim 16, wherein the processing circuit is further configured to control the radio transceiver to send the no-intent-to-use indication in a first transmission-time interval, which immediately precedes a second transmission-time interval containing the transmission opportunity according to the first SPS configuration.

18. The wireless device of claim 12, wherein the processing circuit is configured to control the radio transceiver to transmit the data corresponding to the first V2x traffic type according to the first SPS configuration and to transmit the data corresponding to the second V2x traffic type according to the second SPS configuration as uplink transmissions to the wireless network node.

19. A wireless network node comprising a radio transceiver and a processing circuit, wherein the processing circuit is configured to control the radio transceiver to:
  transmit, to a wireless device, a first and a second semi-persistent scheduling (SPS) configuration, each of the first and the second SPS configurations defining a plurality of periodic transmission opportunities for the wireless device, the first SPS configuration being associated to a first V2x traffic type and the second SPS configuration being associated with a second V2x traffic type, the first and the second SPS configuration having different periods for the periodic transmission opportunities;
  transmit, to the wireless device, information defining, for each of the first and second SPS configurations, a periodic uplink resource for the wireless device to use for sending intent-to-use indications or no-intent-to-use indications for the corresponding SPS configuration;
  receive, from the wireless device, an acknowledgement to use the first and/or the second SPS configuration; and
  receive data corresponding to the first V2x traffic according to the first SPS configuration associated to the first V2x traffic type and receive data corresponding to the second V2x traffic type according to the second SPS configuration associated with the second V2x traffic type.

20. The wireless network node of claim 19, wherein the information defining the periodic uplink resource for each of the two SPS configurations is transmitted with the two SPS configurations.

21. The wireless network node of claim 19, wherein the processing circuit is configured to control the radio transceiver to receive an intent-to-use indication prior to each transmission according to the first SPS configuration, via the periodic uplink resource corresponding to the first SPS configuration.

22. The wireless network node of claim 21, wherein the processing circuit is configured to control the radio transceiver to receive the intent-to-use indication in a first transmission-time interval, which immediately precedes a second transmission-time interval carrying the transmission according to the first SPS configuration.

* * * * *